United States Patent
Bemment et al.

(10) Patent No.: US 11,994,072 B1
(45) Date of Patent: May 28, 2024

(54) FUEL MANAGEMENT SYSTEM

(71) Applicant: ROLLS-ROYCE PLC, London (GB)

(72) Inventors: Craig W Bemment, Derby (GB);
Benjamin J Keeler, Chesterfield (GB);
Christopher P Madden, Derby (GB);
Andrea Minelli, Derby (GB); Peter Swann, Derby (GB); Martin K Yates, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/337,559

(22) Filed: Jun. 20, 2023

(30) Foreign Application Priority Data

Dec. 21, 2022 (GB) ...................................... 2219409

(51) Int. Cl.
| | |
|---|---|
| *F02C 7/224* | (2006.01) |
| *F02C 7/14* | (2006.01) |
| *F02C 7/18* | (2006.01) |
| *F02C 7/232* | (2006.01) |
| *F02C 9/28* | (2006.01) |

(52) U.S. Cl.
CPC ................ *F02C 7/224* (2013.01); *F02C 7/14* (2013.01); *F02C 7/18* (2013.01); *F02C 7/232* (2013.01); *F02C 9/28* (2013.01); *F05D 2220/323* (2013.01); *F05D 2260/213* (2013.01); *F05D 2270/303* (2013.01)

(58) Field of Classification Search
CPC .... F02C 7/24; F02C 7/224; F02C 7/18; F02C 7/14; F02C 3/20; F02C 3/22; F02C 3/24; F02C 9/40; B64D 37/30; B64D 37/34
See application file for complete search history.

(56) References Cited

U.S. PATENT DOCUMENTS

| | | | |
|---|---|---|---|
| 3,300,965 A | * | 1/1967 | Sherlaw .................... F02C 7/14 184/104.3 |
| 4,041,697 A | | 8/1977 | Coffinberry et al. |
| 4,505,124 A | | 3/1985 | Mayer |

(Continued)

OTHER PUBLICATIONS

Durdina et al., "Reduction of Nonvolatile Particulate Matter Emissions of a Commercial Turbofan Engine at the Ground Level from the Use of a Sustainable Aviation Fuel Blend", Oct. 18, 2021.

(Continued)

*Primary Examiner* — Alain Chau
(74) *Attorney, Agent, or Firm* — Oliff PLC

(57) ABSTRACT

A method of operating a gas turbine engine is disclosed, the gas turbine engine comprising an engine core comprising a combustor arranged to burn a fuel; a turbine, the turbine comprising a plurality of turbine blades; a compressor arranged to be used as a source of cooling air for the turbine blades; and an inducer arranged to accelerate and direct the cooling air onto the turbine blades and comprising a plurality of airflow passageways and a modulating valve arranged to control cooling air flow into a subset of the passageways; and a fuel management system arranged to provide the fuel to the combustor, the fuel having a sulphur content of less than 30 ppm. The fuel management system comprises two fuel-oil heat exchangers through which oil and the fuel flow. The method comprises using the modulating valve to adjust the cooling air flow based on turbine inlet temperature.

18 Claims, 19 Drawing Sheets

(56) References Cited

U.S. PATENT DOCUMENTS

| | | | | |
|---|---|---|---|---|
| 4,696,156 | A * | 9/1987 | Burr | B64D 37/34 |
| | | | | 60/39.08 |
| 4,741,152 | A * | 5/1988 | Burr | F02C 7/224 |
| | | | | 60/39.08 |
| 5,544,700 | A | 8/1996 | Shagoury | |
| 5,575,616 | A * | 11/1996 | Hagle | F01D 5/081 |
| | | | | 415/157 |
| 9,109,464 | B2 | 8/2015 | Suciu et al. | |
| 9,322,554 | B2 | 4/2016 | Kim et al. | |
| 9,823,030 | B2 * | 11/2017 | Veilleux, Jr. | F02C 7/224 |
| 10,107,142 | B2 | 10/2018 | Mastro et al. | |
| 10,612,467 | B2 * | 4/2020 | Keeler | F02C 7/14 |
| 11,021,666 | B2 * | 6/2021 | Ginestra | F02C 3/24 |
| 2002/0116929 | A1 | 8/2002 | Snyder | |
| 2004/0006995 | A1 | 1/2004 | Snyder | |
| 2009/0308077 | A1 | 12/2009 | Shelley et al. | |
| 2010/0212857 | A1 | 8/2010 | Bulin et al. | |
| 2013/0199200 | A1 | 8/2013 | Hoke et al. | |
| 2015/0048617 | A1 * | 2/2015 | Veilleux, Jr. | F02C 7/224 |
| | | | | 165/103 |
| 2015/0369082 | A1 | 12/2015 | Schwarz et al. | |
| 2016/0265438 | A1 * | 9/2016 | Keeler | F02C 7/14 |
| 2017/0175019 | A1 * | 6/2017 | Ginestra | C10L 1/04 |
| 2021/0148283 | A1 * | 5/2021 | Niergarth | F01D 25/12 |
| 2023/0212982 | A1 * | 7/2023 | Jouan | F02C 3/22 |
| | | | | 60/772 |

OTHER PUBLICATIONS

"Handbook of Lubrication and Tribology", vol. 1, 2nd Edition, edited by George E. Totten, Published in 2006 by CRC Press, Chapter 6, (2006).

Andreas Linke-Diesinger, "Systems of Commercial Turbofan Engines: An Introduction to System Functions," 2008 Springer-Verlag Berlin Heidelber, pp. 77-82. (Year 2008).

Jafari, S. and Nikolaidis, T., "Thermal Management Systems for Civil Aircraft Engines: Review, Challenges and Exploring the future," Published Oct. 24, 2018, Appl. Sci. 2018, 8, 2044; doi: 10.3390/app8112044.

* cited by examiner

FUEL MANAGEMENT SYSTEM

CROSS-REFERENCE TO RELATED APPLICATIONS

This specification is based upon and claims the benefit of priority from UK Patent Application Number 2219409.6 filed on 21 Dec. 2022, the entire contents of which are incorporated herein by reference.

BACKGROUND

Field of the Disclosure

The present disclosure relates to aircraft propulsion systems, and to methods of operating aircraft involving the management of different fluids.

Description of the Related Art

There is an expectation in the aviation industry of a trend towards the use of fuels different from the traditional kerosene-based jet fuels generally used at present. These fuels may have differing fuel characteristics relative to petroleum-based hydrocarbon fuels.

Thus, there is a need to take account of fuel properties for these new fuels and to adjust the methods of operating gas turbine engines.

SUMMARY

According to a first aspect, there is provided a method of operating a gas turbine engine, the gas turbine engine comprising:
  an engine core comprising a combustor arranged to burn a fuel; a turbine, the turbine comprising a plurality of turbine blades; a compressor arranged to be used as a source of cooling air for the turbine blades; and an inducer arranged to accelerate and direct the cooling air onto the turbine blades and comprising a plurality of airflow passageways and a modulating valve arranged to control cooling air flow into a subset of the passageways; and
  a fuel management system comprising: two fuel-oil heat exchangers through which oil and the fuel flow, the fuel-oil heat exchangers being arranged to transfer heat between the oil and the fuel and comprising a primary fuel-oil heat exchanger and a secondary fuel-oil heat exchanger;
  wherein the method comprises:
    using the fuel management system to provide a fuel with a sulphur content of less than 30 ppm to the combustor; and
    controlling the modulating valve to adjust the cooling air flow based on turbine inlet temperature.

Herein, the primary fuel-oil heat exchanger and the secondary fuel-oil heat exchanger may be referred to as the primary heat exchanger and the secondary heat exchanger, respectively, for brevity.

The modulating valve may allow or block airflow (maximum flow or no flow) into a given passageway or subset of passageways, or may control flow rate such that flow rate may vary in each passageway or subset of passageways.

The inventors have appreciated that the use of fuels different from the traditional kerosene-based jet fuels, such as sustainable aviation fuels, may result in different fuel properties, and that engine operation can be optimised for these different fuel properties. The sulphur content of the fuel should therefore be taken into account when considering heat transfer from the oil to the fuel, as sulphur content is linked to thermal stability of the fuel and a less thermally stable fuel can take less heat before performance issues arise whereas a more thermally stable fuel can take more heat and so be used for more efficient engine cooling.

The fuel may have a density in the range from 760-840 kg/m$^3$ at 15° C. The density of the fuel may affect fuel delivery to, and spray patterns from, fuel spray nozzles of the combustor during a re-light procedure and/or during operation at cruise—selecting a fuel appropriately may therefore improve combustion efficiency and/or re-light speed.

The method may comprise selection of a suitable fuel to use. The selection of the fuel may comprise selecting a single fuel. The selection of the fuel may comprise selecting a fuel mixture. The selected fuel may be the only fuel on board of the aircraft. As such, the selection of the fuel may be performed during refuelling of the aircraft. Alternatively, the selected fuel may be one of several fuels on board the aircraft, or a mixture of one or more of the multiple fuels on board the aircraft; the selection may therefore be performed in flight, and may be automated. The selection may therefore be performed in flight, or may be performed prior to take-off.

The fuel may have an aromatic content of less than or equal to 10% by volume. The fuel may have an aromatic content of 5% or lower by volume. The fuel may have an aromatic content of 1% or lower by volume.

The fuel may have a sulphur content of less than 15 ppm.

The fuel may have a density in the range from 760-840 kg/m$^3$ at 15° C. The fuel may have a density in the range from 760-800 kg/m 3 at 15° C.

According to a second aspect, there is provided a gas turbine engine for an aircraft, the gas turbine engine comprising:
  an engine core comprising a combustor arranged to burn a fuel; a turbine, the turbine comprising a plurality of turbine blades; a compressor arranged to be used as a source of cooling air for the turbine blades; and an inducer arranged to accelerate and direct the cooling air onto the turbine blades and comprising a plurality of airflow passageways and a modulating valve arranged to control cooling air flow into a subset of the passageways, wherein the modulating valve is configured to adjust the cooling air flow based on turbine inlet temperature; and
  a fuel management system arranged to provide the fuel to the combustor, wherein the fuel management system comprises: two fuel-oil heat exchangers through which oil and the fuel flow, the fuel-oil heat exchangers being arranged to transfer heat between the oil and the fuel and comprising a primary fuel-oil heat exchanger and a secondary fuel-oil heat exchanger;
  wherein the fuel has a sulphur content of less than 30 ppm.

The gas turbine engine may therefore be used to implement the method of the first aspect, and may offer the same technical effects and advantages.

The engine core may further comprise a core shaft connecting the turbine to the compressor. The gas turbine engine may further comprise a fan located upstream of the engine core, wherein the fan is driven (directly or indirectly) by the core shaft. The gas turbine engine may be a direct drive engine.

The gas turbine engine may further comprise an accessory gearbox and a pump shaft, wherein the accessory gearbox receives an input from the core shaft and outputs drive to the fuel pump via the pump shaft. The pump speed may therefore be linked to core shaft rotation speed, and may have, by means of the accessory gearbox, a fixed speed relationship between the core shaft (or in some engine architectures, another intermediate shaft) and the fuel pump. In some implementations, the accessory gearbox may instead be arranged to provide a fixed number of different speeds for a given core shaft speed.

The gas turbine engine may further comprise engine bearing chambers. These engine bearing chambers may be cooled using the flow of oil prior to the oil flowing through the fuel-oil heat exchangers. The oil exiting the engine bearing chambers may be hotter than the oil entering the engine bearing chambers. The oil flow path may be a loop, such that the oil is cooled by the fuel-oil heat exchangers before entering the engine bearing chambers, then the hotter oil exiting the engine bearing chambers is recirculated to the fuel-oil heat exchangers.

It is envisaged that all features described for the first or second aspect can equally apply to the other of the first or second aspect.

According to a further aspect, there is provided a method of operating a gas turbine engine, the gas turbine engine comprising:
  an engine core comprising a combustor arranged to burn a fuel; a turbine, the turbine comprising a plurality of turbine blades; a compressor arranged to be used as a source of cooling air for the turbine blades; and an inducer arranged to accelerate and direct the cooling air onto the turbine blades and comprising a plurality of airflow passageways and a modulating valve arranged to control cooling air flow into a subset of the passageways; and
  a fuel management system arranged to provide the fuel to the combustor, wherein the fuel management system comprises: two fuel-oil heat exchangers through which oil and the fuel flow, the fuel-oil heat exchangers being arranged to transfer heat between the oil and the fuel and comprising a primary fuel-oil heat exchanger and a secondary fuel-oil heat exchanger;
  wherein the method comprises:
    using the fuel management system to provide a fuel with a density in the range from 760-840 kg/m³ at 15° C. to the combustor; and
    controlling the modulating valve to adjust the cooling air flow based on turbine inlet temperature.

The inventors have appreciated that the use of fuels different from the traditional kerosene-based jet fuels, such as sustainable aviation fuels, may result in different fuel properties, and that engine operation can be optimised for these different fuel properties. The density of the fuel should therefore be taken into account when considering heat transfer from the oil to the fuel, as a fuel with a lower density at 15° C. is likely to need less heat input to reach a desired density for combustion than a fuel with a higher density at 15° C. It will be appreciated that fuel properties on entry to the combustor can affect engine performance, e.g. due to droplet size and nozzle spray characteristics which influence fuel-air mixing and combustion efficiency.

The fuel may have a sulphur content of less than 30 ppm.
The fuel may have an aromatic content of less than or equal to 10% by volume.

According to a further aspect, there is provided a gas turbine engine for an aircraft, the gas turbine engine comprising:
  an engine core comprising a combustor arranged to burn a fuel; a turbine, the turbine comprising a plurality of turbine blades; a compressor arranged to be used as a source of cooling air for the turbine blades; and an inducer arranged to accelerate and direct the cooling air onto the turbine blades and comprising a plurality of airflow passageways and a modulating valve arranged to control cooling air flow into a subset of the passageways, wherein the modulating valve is configured to adjust the cooling air flow based on turbine inlet temperature; and
  a fuel management system arranged to provide the fuel to the combustor, wherein the fuel management system comprises: two fuel-oil heat exchangers through which oil and the fuel flow, the heat exchangers being arranged to transfer heat between the oil and the fuel and comprising a primary fuel-oil heat exchanger and a secondary fuel-oil heat exchanger;
  wherein the fuel has a density in the range from 760-840 kg/m³ at 15° C.

The fuel may have a sulphur content of less than 30 ppm.
According to a third aspect, there is provided a method of operating a gas turbine engine, the gas turbine engine comprising:
  an engine core comprising a combustor arranged to burn a fuel; a turbine, the turbine comprising a plurality of turbine blades; a compressor arranged to be used as a source of cooling air for the turbine blades; and an inducer arranged to accelerate and direct the cooling air onto the turbine blades and comprising a plurality of airflow passageways, and a modulating valve arranged to allow or block cooling air flow into a subset of the passageways; and
  a fuel management system arranged to provide the fuel to the combustor, wherein the fuel management system comprises: two fuel-oil heat exchangers through which oil and the fuel flow, the fuel-oil heat exchangers being arranged to transfer heat between the oil and the fuel and comprising a primary fuel-oil heat exchanger and a secondary fuel-oil heat exchanger;
  wherein the method comprises:
    using the modulating valve to adjust the cooling air flow based on turbine inlet temperature; and
    controlling the fuel management system so as to transfer between 200 and 600 kJ/m³ of heat to the fuel from the oil in the primary fuel-oil heat exchanger at cruise conditions.

The heat transfer is measured per cubic meter of the fuel on entry to the combustor. The amount of heat transferred to the fuel may therefore be calculated based on a temperature of fuel on approach or entry to the combustor as compared to a temperature of fuel in a fuel tank of the aircraft. Any recirculation through, or bypass of, a heat exchanger may therefore be accounted for. As heat transfer is measured per unit volume of fuel, this may be thought of as a heat transfer rate normalised for fuel flow rate variations at cruise The inventors appreciated that the use of fuels different from the traditional kerosene-based jet fuels, such as sustainable aviation fuels for example, may allow for more heat to be transferred from the oil to the fuel per unit volume of the fuel through the heat exchange system. Higher fuel temperatures on entry to the combustor may allow for improved fuel burn efficiency, as well as improved oil cooling (as the fuel is able to take more heat). For example, a higher-temperature fuel may be less viscous which may result in a different nozzle spray-pattern and droplet size within the combustor, so changing fuel-air mixing and improving combustion efficiency. Heat transfer may be optimised to tailor the fuel spray characteristics within the combustor. In addition, cooler oil may allow more heat to be carried away from engine components such as bearings for the same oil flow rate, or may allow a lower oil flow rate to be used for the same level of cooling.

The controlling the fuel management system may comprise controlling fuel flow through the heat exchangers—for example recirculating a variable proportion of the fuel through the primary fuel-oil heat exchanger, and/or allowing a variable proportion of the fuel to bypass the primary fuel-oil heat exchanger.

The controlling the fuel management system may comprise controlling oil flow through the heat exchangers—for example allowing a variable proportion of the oil to bypass the primary fuel-oil heat exchanger or the secondary fuel-oil heat exchanger, and/or recirculating a variable proportion of the oil through the primary and/or secondary fuel-oil heat exchanger.

One or more valves, pumps, and/or recirculation or bypass pipes may be provided as appropriate to facilitate this control.

The method may comprise transferring 300-500 kJ/m$^3$ of heat to the fuel in the primary fuel-oil heat exchanger at cruise conditions. The method may comprise transferring 350-450 kJ/m$^3$ of heat to the fuel in the primary fuel-oil heat exchanger at cruise conditions. The method may comprise transferring 400 kJ/m$^3$ of heat to the fuel in the primary fuel-oil heat exchanger at cruise conditions.

According to a fourth aspect, there is provided a gas turbine engine for an aircraft, the gas turbine engine comprising:
  an engine core comprising a combustor arranged to burn a fuel; a turbine, the turbine comprising a plurality of turbine blades; a compressor arranged to be used as a source of cooling air for the turbine blades; and an inducer arranged to accelerate and direct the cooling air onto the turbine blades and comprising a plurality of airflow passageways and a modulating valve arranged to allow or block cooling air flow into a subset of the passageways, wherein the modulating valve is configured to adjust the cooling air flow based on turbine inlet temperature; and
  a fuel management system arranged to provide the fuel to the combustor, wherein the fuel management system comprises: two fuel-oil heat exchangers through which oil and the fuel flow, the heat exchangers being arranged to transfer heat between the oil and the fuel and comprising a primary fuel-oil heat exchanger and a secondary fuel-oil heat exchanger;
  and wherein the fuel management system is arranged to transfer 200-600 kJ/m$^3$ of heat to the fuel in the primary fuel-oil heat exchanger at cruise conditions.

The inventors have appreciated that, especially with the use of fuels different from the traditional kerosene-based jet fuels, such as sustainable aviation fuels, fuel properties at cruise conditions may be controlled by careful engine management so as to improve performance. For example, the fuel management system may recirculate fuel through one or more fuel-oil heat exchangers (e.g. using a recirculation valve), and/or divert fuel past one or more fuel-oil heat exchangers (e.g. using a bypass valve), or change oil or fuel flow rates, so as to tailor the amount of heat transferred per unit volume of fuel. As discussed with respect to the third aspect, this may be used to optimise combustion conditions.

The fuel management system may further comprise one or more valves, pumps, and/or recirculation or bypass pipes, which may be used to control oil and/or fuel flow through the two fuel-oil heat exchangers so as to adjust the amount of heat transferred.

The engine core may further comprise a core shaft connecting the turbine to the compressor. The gas turbine engine may further comprise a fan located upstream of the engine core, wherein the fan is driven by the core shaft.

The gas turbine engine may be a direct drive engine.

The gas turbine engine may further comprise an accessory gearbox and a pump shaft, wherein the accessory gearbox receives an input from the core shaft and outputs drive to the fuel pump via the pump shaft. The pump speed may therefore be linked to core shaft rotation speed, and may have, by means of the accessory gearbox, a fixed speed relationship between the core shaft (or in some engine architectures, another intermediate shaft) and the fuel pump. In some implementations, the accessory gearbox may instead be arranged to provide a fixed number of different speeds for a given core shaft speed.

The gas turbine engine may further comprise engine bearing chambers. These engine bearing chambers may be cooled using the flow of oil prior to the oil flowing through one or both of the fuel-oil heat exchangers. The oil exiting the engine bearing chambers may be hotter than the oil entering the engine bearing chambers. The oil flow path may be a loop, such that the oil is cooled by the fuel-oil heat exchangers before re-entering the engine bearing chambers, then the hotter oil exiting the engine bearing chambers is recirculated to the fuel-oil heat exchangers.

It is envisaged that all features described for the third or fourth aspect can equally apply to the other of the third or fourth aspect, and that the third or fourth aspect may be used in conjunction with the first or second aspect, or with either of the further aspects discussed in relation to the first and second aspects.

In any or all of the above aspects, one or more of the features described below may apply.

The oil may enter the fuel-oil heat exchangers at a higher temperature than the fuel at cruise conditions, such that the fuel-oil heat exchangers are arranged to transfer heat from the oil to the fuel.

The fuel may flow through the primary fuel-oil heat exchanger prior to flowing through the secondary fuel-oil heat exchanger.

The primary fuel-oil heat exchanger may be referred to as a main fuel-oil heat exchanger. The majority of the heat transfer between the oil and the fuel may occur in the primary fuel-oil heat exchanger. The primary function of the primary fuel-oil heat exchanger may be to heat the fuel before it is provided to the combustor. At least substantially all of the fuel may pass through the main fuel-oil heat exchanger.

The secondary fuel-oil heat exchanger may be a servo fuel-oil heat exchanger. A portion, but not all, of the fuel leaving the main fuel-oil heat exchanger may be directed to the servo fuel-oil heat exchanger. The servo fuel-oil heat exchanger may increase the temperature of the fuel further, so providing additional oil cooling, before providing the fuel for use in servo mechanisms of the gas turbine engine (e.g. for fueldraulic actuation and/or heating). These servo mechanisms may include a nacelle anti-icing system. The servo mechanisms may include engine actuators. The servo mechanisms may include a turbine case and/or turbine blade cooling servo valve. Only fuel which has passed through the secondary fuel-oil heat exchanger may be used in these auxiliary systems. The fuel used in these systems may be returned to a fuel tank for later recirculation, or may be recombined with other fuel leaving the main fuel-oil heat exchanger and enter the combustor.

Fuel that passes through the secondary fuel-oil heat exchanger may not be sent to the combustor, such that all heat transferred from the oil to fuel which reaches the combustor is transferred in the primary fuel-oil heat exchanger. It will be appreciated that fuel returned to the fuel tank from the auxiliary systems after passing through the secondary heat exchanger may later be sent to the combustor, however any residual heat transferred from the secondary fuel-oil heat exchanger on the fuel's previous pass through the engine is likely to be negligible.

The fuel management system may comprise an engine fuel pump arranged to pump the fuel towards the combustor and/or the secondary fuel-oil heat exchanger. The primary fuel-oil heat exchanger may be upstream of the pump, such that the fuel flows through the pump after leaving the primary fuel-oil heat exchanger. The secondary fuel-oil heat exchanger may be downstream of the pump, such that fuel leaving the secondary fuel-oil heat exchanger does not then flow through the pump. The pump may therefore be shielded from the higher temperatures that may be reached for fuel in the secondary fuel-oil heat exchanger.

In implementations in which fuel that passes through the secondary fuel-oil heat exchanger is not sent to the combustor, all heat transferred from the oil to fuel which reaches the combustor may therefore be transferred in the primary fuel-oil heat exchanger. The secondary fuel-oil heat exchanger may therefore not affect the temperature of fuel entering the combustor.

At least a portion of the fuel may not pass through the secondary fuel-oil heat exchanger. At least a portion of the fuel may not pass through the primary fuel-oil heat exchanger. A bypass route may be provided for one or each heat exchanger, to allow a portion of the fuel to bypass that heat exchanger.

The fuel management system may further comprise a recirculation valve located downstream of the primary heat exchanger and between the primary heat exchanger and the combustor. The recirculation valve may be arranged to allow a controlled amount of fuel which has passed through the primary heat exchanger to be returned to the inlet of the primary heat exchanger.

The method may therefore comprise controlling fuel flow through the heat exchangers by controlling the fuel amount returned to the inlet of the primary heat exchanger. The recirculated fuel may therefore pass through the primary heat exchanger at least twice, gaining more heat.

A portion of fuel may be directed through the secondary fuel-oil heat exchanger by any suitable means such as one or more valves or the like.

Approximately between 10% and 30% of the fuel beyond the primary fuel-oil heat exchanger (i.e. of the fuel which has passed through or bypassed the primary fuel-oil heat exchanger) may be delivered to the secondary fuel-oil heat exchanger. This may be described as between 10% and 30% of the fuel on the main fuel path upstream of the secondary fuel-oil heat exchanger. For example, between 10% and 20% or between 13% and 17% of the fuel may be delivered to the secondary fuel-oil heat exchanger. As such, more of the fuel generally flows from the primary heat exchanger to the combustor without flowing through the secondary heat exchanger than flows through the secondary heat exchanger. The flow path from the primary heat exchanger to the combustor may therefore be described as a main fuel flow path, with a proportion of the fuel being diverted off that path to flow through the secondary fuel-oil heat exchanger, and optionally some or all of that proportion returned to the main fuel flow path before the combustor.

Approximately 0-10%, 20-30%, 20-40%, or 30-40% of the fuel may pass through the secondary fuel-oil heat exchanger. In other examples, a higher proportion of fuel may pass through the secondary fuel-oil heat exchanger.

A fixed portion of fuel may pass through the secondary fuel-oil heat exchanger. A variable portion of fuel may pass through the secondary fuel-oil heat exchanger; the variation may be controlled by an automated feedback system (e.g. implemented by a controller of the fuel management system), optionally based on data from one or more temperature sensors. The one or more temperature sensors may be arranged to detect fuel or oil temperature.

A ratio of the heat transfer from the oil to the fuel for the primary and secondary fuel-oil heat exchangers, for fuel that passes through both heat exchangers, may be approximately between 70:30 and 90:10. For example, for fuel that passes through both heat exchangers, 70% of the heat gained by that fuel may be provided to that fuel in the primary heat exchanger and the remainder may be provided by the secondary heat exchanger, for a ratio of 70:30.

The ratio of the heat transfer from the oil to the fuel for the primary and secondary fuel-oil heat exchangers may be approximately 80:20.

In other examples, the ratio of the heat transfer from the oil to the fuel for the secondary fuel-oil heat exchanger may be higher.

The oil may flow through the secondary fuel-oil heat exchanger prior to flowing through the primary fuel-oil heat exchanger. The oil may not flow through any components which would increase its temperature between leaving the secondary fuel-oil heat exchanger and entering the primary fuel-oil heat exchanger. As such, the temperature of the oil flowing through the secondary fuel-oil heat exchanger may be higher than the temperature of the oil flowing through the primary fuel-oil heat exchanger at cruise.

The fuel may flow through the primary fuel-oil heat exchanger prior to flowing through the secondary fuel-oil heat exchanger. It will be appreciated that the fuel exiting the secondary fuel-oil heat exchanger is therefore generally hotter than the fuel exiting the primary fuel-oil heat exchanger.

The fuel may flow through the primary fuel-oil heat exchanger prior to flowing through the secondary fuel-oil heat exchanger whereas the oil may flow through the secondary fuel-oil heat exchanger prior to flowing through the primary fuel-oil heat exchanger—the oil and fuel flow directions may therefore be opposed.

In some implementations, the fuel exiting the secondary fuel-oil heat exchanger is delivered to the combustor, rather than being passed to a pump and then optionally recirculated, for example. This reduces the flow path length and time spent with the fuel at its highest temperature during the fuel delivery process, reducing temperature losses to the environment. Further, the shorter fuel path may reduce the number of components which are interacted with by the fuel at its highest temperature, which may improve component longevity (e.g. protecting the pump).

In other implementations, the fuel exiting the secondary fuel-oil heat exchanger is instead delivered back to a fuel tank, optionally via use in one or more auxiliary systems as mentioned above (e.g. fueldraulics). This flow path may again avoid the engine fuel pump, so protecting that pump. Mixing with other fuel in the fuel tank may lower the average fuel temperature of the fuel that has just passed through the fuel-oil heat exchangers (it will generally increase the average fuel temperature of the overall body of fuel in the tank, which may provide a secondary benefit, especially in cold conditions).

Further, the placement of the fuel pump between the primary and secondary fuel-oil heat exchangers may assist in preserving the life of the fuel pump. The temperature of the fuel may be elevated on exiting the primary heat exchanger, and yet further elevated on exiting the secondary heat exchanger. The placement of the fuel pump between the two, and more specifically before the secondary heat exchanger, reduces the exposure of the fuel pump to the highest temperature fuel flow, and therefore reduces the damage associated with these high temperatures.

Fuel flow may be controlled by using a recirculation valve located downstream of the primary heat exchanger, the recirculation valve arranged to allow a controlled amount of fuel which has not passed through the secondary heat exchanger to be returned to the inlet of the primary heat exchanger.

Alternatively or additionally, fuel flow may be controlled by using a bypass pipe located across one or each fuel-oil heat exchanger. The bypass pipe may be arranged to allow a controlled amount of fuel to bypass the respective heat exchanger entirely.

Alternatively or additionally, oil flow may be controlled by using a bypass pipe located across one or each fuel-oil heat exchanger. The bypass pipe may be arranged to allow a controlled amount of oil to bypass the respective heat exchanger entirely.

The gas turbine engine may form part of an aircraft. The aircraft may comprise a fuel tank, and a fuel supply pump configured to supply a flow of fuel to the fuel management system of the engine itself. The fuel supply pump may be described as a fuel tank pump or a low pressure pump, and is located upstream of the engine, and therefore upstream of the primary fuel-oil heat exchanger.

A fuel pump of the fuel management system may be described herein as a main fuel pump or engine fuel pump, as, unlike the fuel supply pump, it is a part of the engine itself. The main fuel pump may be located downstream of the primary fuel-oil heat exchanger. The main fuel pump may be located upstream of the secondary fuel-oil heat exchanger. One or more auxiliary fuel pumps may be located at any suitable position along the fuel flow path.

As discussed above, at least a portion of the fuel flowing through the secondary fuel-oil heat exchanger may be provided to servo mechanisms of the aircraft. At least a portion of this fuel may then be returned to an aircraft fuel tank or to the low pressure pump for recirculation.

Alternatively or additionally, at least a portion of the fuel flowing through the secondary fuel-oil heat exchanger may be returned to any point on the fuel flow path; for example back to the inlet of the primary or secondary fuel-oil heat exchanger, or to re-join flow from the primary fuel-oil heat exchanger on its way to the combustor.

In some example implementations, a third, fourth or any suitable number of further fuel-oil heat exchangers may be present, optionally with a fuel valve operable to control a flow rate of fuel therethrough.

Oil flow within the gas turbine engine may follow a closed loop. The closed loop oil system may be configured to supply a recirculating flow of oil within the engine and may be described as a recirculating lubrication and/or cooling system, or as a recirculating oil system. At least one of the primary and secondary fuel-oil heat exchangers may be described as forming part of the closed loop system. The recirculating lubrication and/or cooling system may be described as an oil heat management system, as heat is removed from the oil after it has been warmed in the process of lubricating and/or cooling other system components.

The closed loop system may comprise at least a first oil pump configured to pump a flow of oil around at least a portion of the recirculating oil system. The first oil pump may be located at any suitable position around the recirculating oil system. The recirculating oil system may be configured such that the flow of oil flows through engine components (e.g. the engine bearing chamber) and may then be collected in a sump. The first oil pump may be configured to pump oil from the sump to a first oil tank. As such, the first oil pump may be described as a scavenge pump.

The oil tank may be suitable for containing a volume of oil. The oil tank may be configured to contain any suitable volume of oil. The oil tank may be arranged to remove gasses from the oil in the first oil tank. Oil leaving the oil tank may pass through a filter, strainer, or the like.

A second oil pump may be located between the first oil tank and the primary or secondary fuel-oil heat exchanger. The second oil pump may be described as a feed pump. The second oil pump may be configured to pump oil from the first oil tank to the primary or secondary fuel-oil heat exchanger.

In some implementations, at least a portion of the oil flows through the primary fuel-oil heat exchanger and at least a portion of the oil flows through the secondary fuel-oil heat exchanger. All of the oil may flow through both the primary and secondary fuel-oil heat exchangers. As discussed above, the oil may first flow through the secondary fuel-oil heat exchanger, and then through the primary fuel-oil heat exchanger, so having the opposite flow route from that of the fuel.

The gas turbine engine may further comprise one or more air-oil heat exchangers. The one or more air-oil heat exchangers may form part of the recirculating oil system. The one or more air-oil heat exchangers may be arranged in flow series with the primary and secondary fuel-oil heat exchangers such that at least a portion of the flow of oil flows through an air-oil heat exchanger prior to entering the primary or secondary fuel-oil heat exchanger, or after leaving the primary or secondary fuel-oil heat exchanger. In an example, the oil may flow through secondary fuel-oil heat exchanger before flowing through an air-oil heat exchanger (e.g. a Surface Air Cooled Oil Cooler) and then the primary fuel-oil heat exchanger.

In the examples described above, the engine architecture may be a direct-drive engine with no gearbox separating a core shaft and a fan shaft.

In other engine architectures, the engine may be differently designed, for example being a geared engine instead of a direct-drive engine.

According to a fifth aspect, there is provided a method of operating a gas turbine engine, the gas turbine engine comprising:
  an engine core comprising a turbine, a compressor, a combustor arranged to combust a fuel, and a core shaft connecting the turbine to the compressor;
  a fan located upstream of the engine core;
  a fan shaft;
  a gearbox (which may be referred to as a main gearbox) that receives an input from the core shaft and outputs drive to the fan via the fan shaft, the gearbox comprising gears and journal bearings associated therewith;
  a recirculating lubrication system arranged to supply oil to lubricate the gears and journal bearings, the lubrication system comprising a first oil tank arranged to supply oil to the gears and journal bearings and a second oil tank arranged to supply oil to the journal bearings only; and
a heat exchange system arranged to transfer heat between the oil and the fuel.

The method comprises, at cruise conditions:
controlling the heat exchange system so as to transfer 200-600 kJ/m³ of heat to the fuel from the oil; and
providing cooler oil to the journal bearings than to the gears.

The heat transfer is measured per cubic meter of the fuel on entry to the combustor. As heat transfer is measured per unit volume of fuel, this may be thought of as a heat transfer rate normalised for fuel flow rate variations at cruise This transfer of heat from the oil to the fuel may be used to control the oil temperature on entry to the gearbox, and more specifically to the journal bearings and to the gears of the gearbox.

The inventors appreciated that the use of fuels different from the traditional kerosene-based jet fuels, such as sustainable aviation fuels for example, may allow for more heat to be transferred from the oil to the fuel per unit volume of the fuel through the heat exchange system. Higher fuel temperatures on entry to the combustor may allow for improved fuel burn efficiency, as well as improved oil cooling.

The controlled transfer of heat from the oil to the fuel through the heat exchange system at cruise conditions plays a part in controlling the oil temperature, and different fuels may allow improved oil cooling, so allowing oil temperatures to be optimised.

The journal bearings may take a greater load and/or heat up more than the gears, and that it may therefore be more important to provide cool oil to the journal bearings than to the gears, to improve lubrication and/or allow more heat to be carried away by the oil. A lower oil temperature may be reached if a smaller volume of oil is cooled, for the same temperature of the cooling medium (here, likely to be the fuel). Choosing not to cool a proportion of the oil leaving the oil tank may therefore allow the cooled portion of the oil to reach a lower temperature. The inventors appreciated that, for improved effectiveness of cooling and lubrication, the recirculating lubrication system may therefore be arranged to provide oil at different temperatures to different components, based on their needs, rather than treating all oil in the system in the same way. Having proportions of the oil at different temperatures and allowing controlled mixing of these oils at different temperatures may allow improved tailoring of oil temperature for a given use/component.

Further, journal bearing are generally less tolerant of variation in lubrication film thickness than gears. A "touch down" of metal-to-metal contact with journal bearings can cause a much more rapid failure progression than gear meshing. The journal bearings rely on a constant supply of oil under any operating conditions, even in the event of failure in the oil supply system (e.g oil pump failure or pipe leak). There is therefore also a positive impact of being able to use less oil flow to the journal bearings. As cooler oil allows a reduced flow of oil to be used for the same cooling effect, the redundancy required in the oil system to deal with any failures can be more easily managed, and the components in the oil system can be of smaller size. For example, in current systems, oil maybe supplied to the journal bearings from two different oil supplies and the supply is double the required minimum oil flow, such that if one supply fails the other supply can still provide the required flow to the bearings. With a reduced oil temperature for the journal bearings, double the required flow may still be required, but the required flow is lower than with warmer oil. This has a positive impact in terms of component size (e.g oil pump size) and improves power gearbox efficiency and hence specific fuel consumption (SFC) of the engine. Focussing the cooling on the portion of total oil flow that is destined for the journal bearings may therefore be used to increase the amount of heat that can be absorbed from the journal bearings (if the flow rate is kept the same, or reduced by an amount small enough not to completely counterbalance the benefit provided from the oil being cooler) and/or to allow a reduced flow rate to be used for the same level of heat removal.

In some implementations, for example, some oil from a main oil tank is cooled (by passing through one or more heat exchangers), whereas other oil is sent from the main oil tank to the gearbox without such cooling. In various implementations, none of the uncooled oil from the main oil tank may go to the journal bearings; i.e. only cooled oil from the main oil tank may go to the journal bearings of the gearbox. All of the uncooled oil, mixed with a percentage of the cooled oil, may go to the gears of the gearbox.

The oil provided to the journal bearings may be at least 10° C. cooler than the oil supplied to the gears at cruise conditions. The oil provided to the journal bearings may be at least 15° C., 20° C., 25° C., 30° C., 35° C., 40° C., or 45° C. cooler than the oil supplied to the gears. The oil provided to the journal bearings may be 30° C. cooler than the oil supplied to the gears. The oil provided to the journal bearings may be between 20° C. and 40° C. cooler than the oil supplied to the gears.

The oil provided to the journal bearings may have a temperature of between 80° C. and 120° C., and optionally of 100° C., at cruise conditions. The oil provided to the gears may have a temperature of between 100° C. and 140° C., and optionally of 130° C., at cruise conditions.

The method may comprise transferring 300-500 kJ/m³ of heat to the fuel from the oil through the heat exchange system at cruise conditions. The method may comprise transferring 350-450 kJ/m³ of heat to the fuel from the oil through the heat exchange system at cruise conditions. The method may comprise transferring 400 kJ/m³ of heat to the fuel from the oil through the heat exchange system at cruise conditions. This transfer of heat may be used to control the oil temperature on entry to the gearbox.

The oil may have an average temperature of up to 160° C., 180° C., 200° C. or 220° C. on entry to the heat exchange system at cruise conditions.

In addition to gaining heat from the main gearbox, the oil may pass through and cool one or more other engine components, optionally including an auxiliary gearbox (AGB) and/or one or more bearing chambers. These engine components may add more heat to the oil, raising its temperature to higher than it would be from heat taken from the main gearbox alone.

The oil in the recirculating lubrication system may therefore pass through an auxiliary gearbox and one or more journal bearings of the engine as well as through the main gearbox, and the oil may have an average temperature of up to 220° C. on entry to the heat exchange system at cruise conditions (even if oil leaving the main gearbox is significantly cooler).

The gas turbine engine may comprise an integrated drive generator.

The recirculating lubrication system may comprise first and second closed loop systems, wherein the second closed loop system provides oil to the gearbox, and the first closed loop system provides oil to the integrated drive generator.

The method may comprise transferring heat from oil in the second closed loop system to the fuel. The method may comprise transferring heat from oil in the first closed loop system to the fuel.

Heat may be transferred from the oil in the first closed loop system to the fuel before heat is transferred from the oil in the second closed loop system to the fuel.

More heat may be output into oil in the second closed loop system by the gearbox than is output into oil in the first closed loop system by the integrated drive generator (IDG).

It will be appreciated that whilst the gearbox generally outputs more heat in terms of absolute heat rejection, the heat rejection from the main gearbox, which may also be referred to as a power gearbox (PGB), generally results in low-grade heat with relatively high oil flow rates—i.e. the oil flow rate may be kept high such that the oil leaving the gearbox does not reach as high a temperature as it would were the oil flow rate the same as through the IDG. The oil leaving the PGB is generally still hotter than the oil leaving the IDG, although it will be appreciated that this may vary between implementations.

For example, a PGB may output around 75 kW of heat at cruise. The oil volumetric flow to the PGB at the same conditions may be around 0.002 $m^3$/s. By contrast, an IDG may output only around 18.4 kW of heat at cruise, so only about 25% of the heat output of the PGB—the PGB therefore may output around four times as much heat as the IDG. However, the oil volumetric flow rate to the IDG may be only around 0.00062 $m^3$/s. Oil leaving the PGB may therefore have only around 1.2 times the heat transferred to it per unit volume as compared to oil leaving the IDG, despite the PGB's heat output being four times as high.

PGB oil flow rate at cruise may be between 100 litres per minute and 150 litres per minute, and optionally may be around or equal to 126 l/min. IDG oil flow rate at cruise may be between 30 litres per minute and 45 litres per minute, and optionally may be around or equal to 37 l/min.

PGB heat output in various implementations may be from 50 to 100 kW. IDG heat output in various implementations may be from 5 kW to 25 kW.

Multiple heat exchangers may be provided to cool the oil before it re-enters the gearbox (and/or other engine components to be lubricated and/or cooled), the multiple heat exchangers including a fuel-oil heat exchanger and at least one of:
  (i) an air-oil heat exchanger; and
  (ii) an oil-oil heat exchanger, having a flow of oil from a different source flowing therethrough (e.g. for heat transfer between first and second closed loop systems).

In such implementations, the multiple heat exchangers may be arranged in a parallel configuration and the method may comprise sending a proportion of the oil through each branch of the parallel configuration, and adjusting that proportion to vary how much oil flows through the fuel-oil heat exchanger and how much oil flows through a heat exchanger on the other branch. The parallel configuration may comprise a first branch with the fuel-oil heat exchanger, and a second branch with an air-oil heat exchanger and/or an oil-oil heat exchanger.

The method may comprise transferring at least 40% of the heat lost from the oil from the oil to the fuel, with the remainder of the heat transferred from the oil to air or to other oil. The method may comprise transferring at least 50%, 60% or 70% of the heat lost from the oil from the oil to the fuel, with the remainder of the heat transferred from the oil to air or to other oil.

A closed-loop oil system may split, or branch, such that oil is sent down two (or more) different branches which then re-join, so providing parallel oil flows around a section of the loop. The multiple heat exchangers may therefore be arranged in a parallel configuration and the method may comprise sending a proportion of the oil through each branch of the parallel configuration, and adjusting that proportion to vary how much oil flows through the fuel-oil heat exchanger and how much oil flows through at least one heat exchanger on the other branch.

The parallel configuration may comprise a first branch with the fuel-oil heat exchanger, and a second branch with one or more of an air-oil heat exchanger and an oil-oil heat exchanger.

The first closed loop system and the second closed loop system may be configured to interact via at least one oil-oil heat exchanger such that heat may be transferred from one flow of oil to the other.

According to a sixth aspect there is provided a gas turbine engine for an aircraft, the gas turbine engine comprising:
  an engine core comprising a turbine, a compressor, a combustor arranged to combust a fuel, and a core shaft connecting the turbine to the compressor;
  a fan located upstream of the engine core;
  a fan shaft;
  a gearbox that receives an input from the core shaft and outputs drive to the fan via the fan shaft, the gearbox comprising gears and journal bearings;
  a recirculating lubrication system arranged to supply oil to lubricate the gears and journal bearings, the lubrication system comprising a first oil tank arranged to supply oil to the gears and journal bearings and a second oil tank arranged to supply oil to the journal bearings only; and
  a heat exchange system arranged to transfer heat between the oil and the fuel,
  wherein the recirculating lubrication system is arranged to provide cooler oil to the journal bearings than to the gears at cruise conditions; and
  wherein the heat exchange system is arranged to transfer 200-600 kJ/$m^3$ of heat to the fuel from the oil at cruise conditions.

The transfer of heat to the fuel from the oil at cruise conditions may be used to control the oil temperature on entry to the gearbox.

The gas turbine engine may further comprise an auxiliary gearbox. The oil in the recirculating lubrication system may be arranged to cool the auxiliary gearbox, thereby increasing in temperature.

The gas turbine engine may further comprise one or more bearing chambers. The oil in the recirculating lubrication system may be arranged to cool the one or more bearing chambers, thereby increasing in temperature.

The heat transfer is measured per cubic meter of fuel on entry to the combustor. The amount of heat transferred to the fuel may therefore be calculated based on a temperature of fuel on approach or entry to the combustor as compared to a temperature of fuel in a fuel tank of the aircraft. Any recirculation through, or bypass of, a heat exchanger may therefore be accounted for.

As heat transfer is measured per unit volume of fuel, this may be thought of as a heat transfer rate normalised for fuel flow rate variations at cruise.

The gas turbine engine may therefore be used to implement the method of the fifth aspect, and may offer the same technical effects and advantages.

It is envisaged that all features described for the fifth or sixth aspect can equally apply to the other of the fifth or sixth aspect.

At cruise conditions, and for all aspects described herein, the flow of oil entering any of the fuel-oil heat exchangers may have a higher average temperature than the flow of fuel entering the same fuel-oil heat exchanger. In this way, thermal energy may be transferred from the flow of oil to the flow of fuel flowing through the one or more fuel-oil heat exchangers at cruise conditions. As such, oil leaving each heat exchanger may have a lower temperature than the oil entering that heat exchanger at cruise conditions.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high-pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan-drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flow-path (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of)

any of the following: 9. 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1520K, 1530K, 1540K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing have the conventional meaning and would be readily understood by the skilled person. Thus, for a given gas turbine engine for an aircraft, the skilled person would immediately recognise each term to refer to an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions. Additionally or alternatively, climb may refer to a nominal point in an aircraft flight cycle between take-off and landing, where a relative increase in altitude is required, which may require an additional thrust demand of the engine.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft. During either or both of descent and approach, the engine may be producing between 20% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
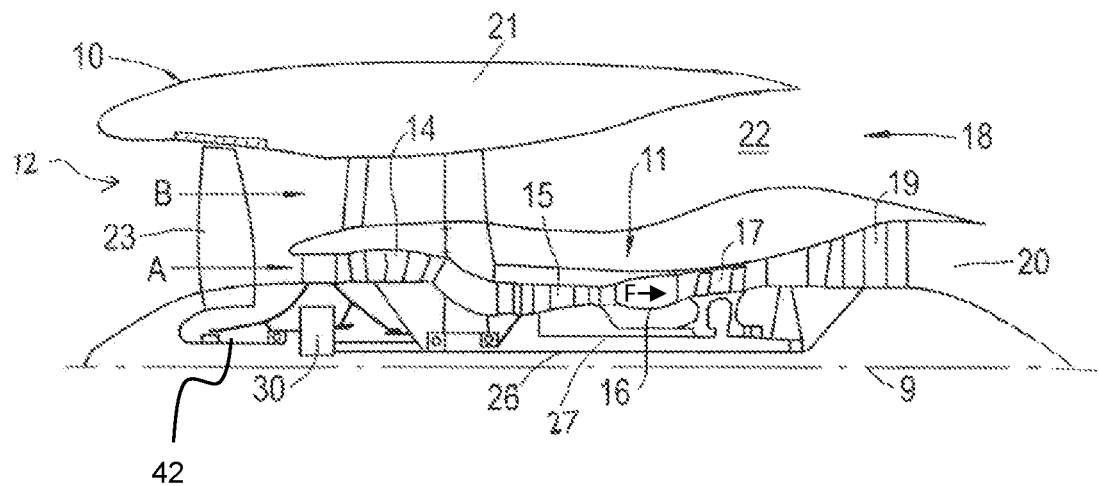
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
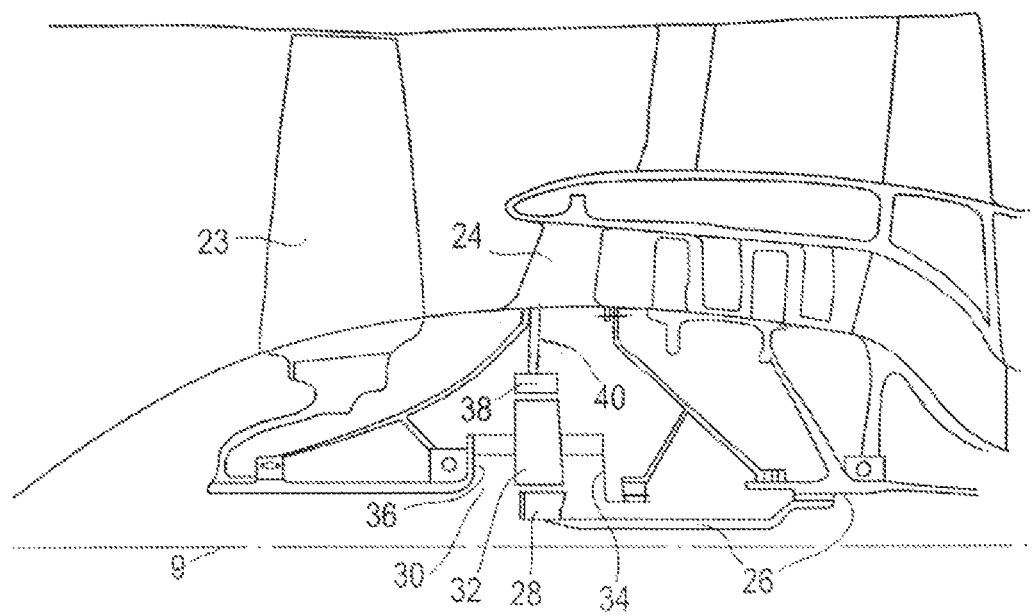
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Figure 20:
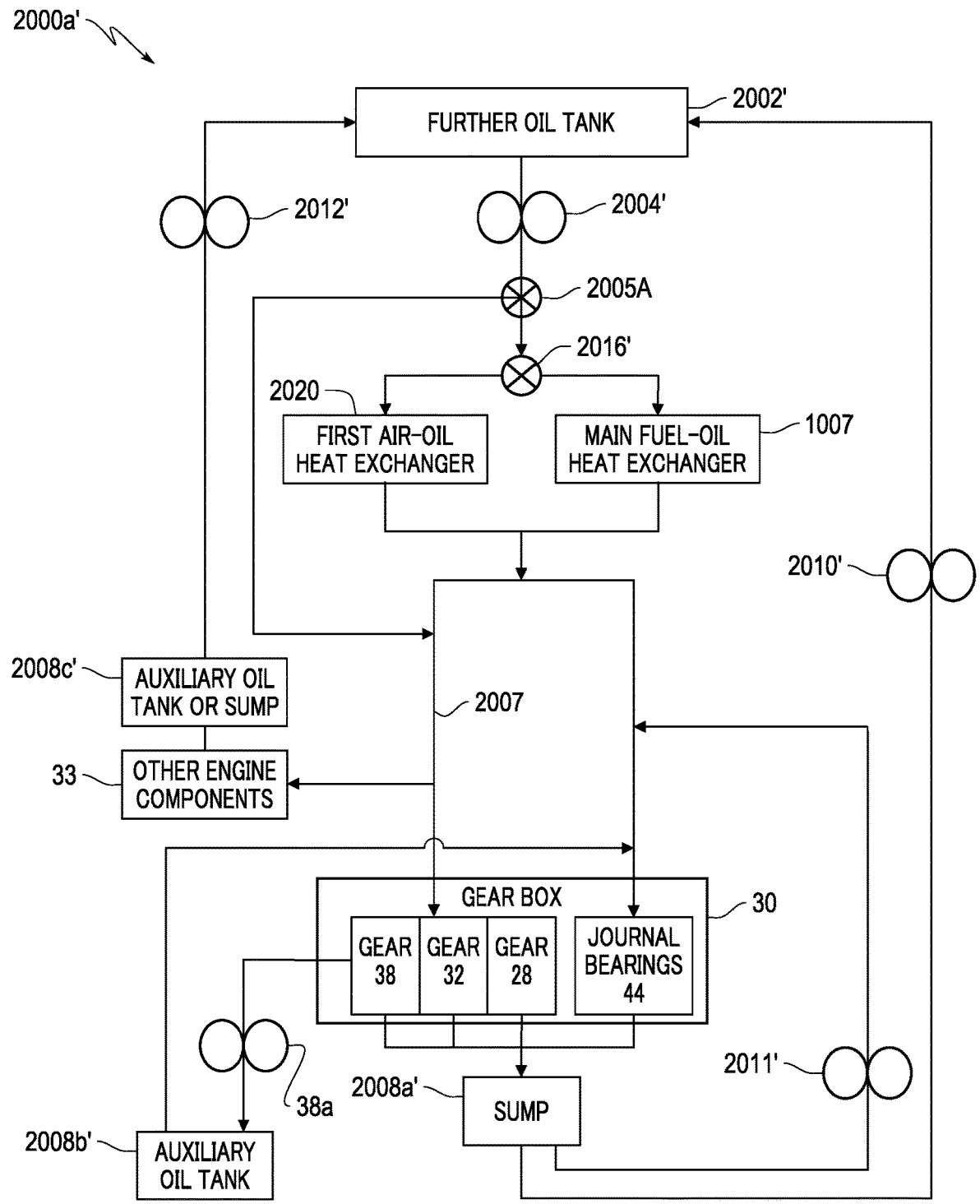
FIG. 20 is a schematic representation of a further alternative portion of an example recirculating lubrication system.

In implementations such as those mentioned above with respect to the fifth and sixth aspects, one or more of the gears of the gearbox may be mounted on journal bearings 44 (as shown in FIG. 20). In particular, each planet gear 32 may be rotatably mounted on a journal bearing 44 for rotation about an axis. These journal bearings may be described as journal bearings of the gearbox 30, and as being associated with the respective gears.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3A:
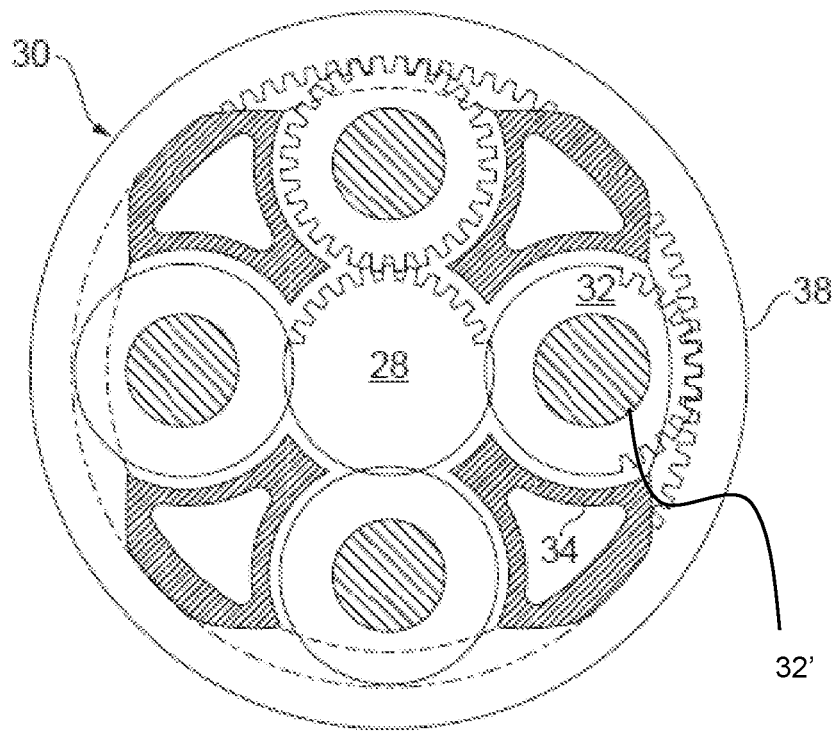
FIG. 3A is a partially cut-away view of a gearbox for a gas turbine engine.

The epicyclic gearbox 30 is shown by way of example in greater detail in FIG. 3A. Each of the sun gear 28, planet gears 32 and ring gear 38 comprise teeth about their periphery to intermesh with the other gears. However, for clarity only exemplary portions of the teeth are illustrated in FIG. 3A. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3A is of the planetary type, in that the planet carrier 34 is coupled to an output shaft 42 via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3A is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft—e.g. fan shaft 42—and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. By way of further example, other gas turbine engines to which the present disclosure may be applied may have no gearbox for the main shaft(s), instead being direct drive engines. A cross-sectional view of one such engine is shown in FIG. 3B.

Figure 3B:
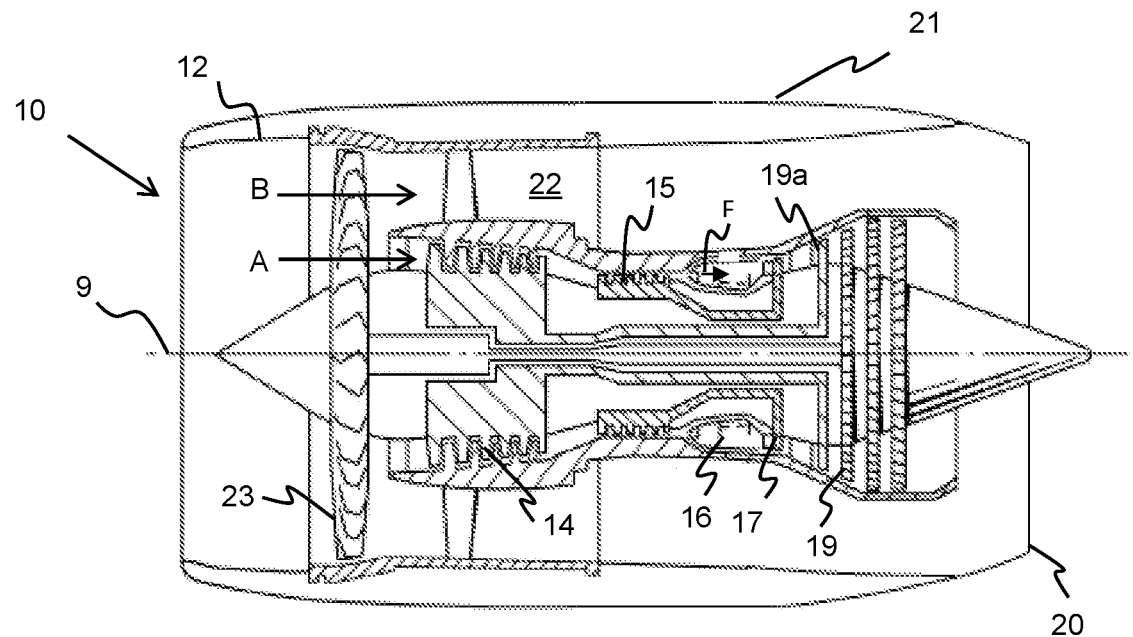
FIG. 3B is a sectional side view of a direct drive gas turbine engine, the direct drive engine not having a gearbox as shown in FIG. 3A.

With reference to FIG. 3B, a gas turbine engine is generally indicated at 10, having a principal rotational axis 9. The engine 10 comprises, in axial flow series, an air intake 12, a propulsive fan 23, an intermediate pressure compressor 14, a high-pressure compressor 15, combustion equipment 16, a high-pressure turbine 17, an intermediate pressure turbine 19a, a low-pressure turbine 19 and an exhaust nozzle 20. A nacelle 21 surrounds the engine 10 and defines both the intake 12 and the exhaust nozzle 20.

In use, air entering the intake 12 is accelerated by the fan 23 to produce two air flows: a core airflow A and a bypass airflow B. The core airflow A flows into the intermediate pressure compressor 14, and the bypass air flow B passes through a bypass duct 22 to provide propulsive thrust. The intermediate pressure compressor 14 compresses the airflow A before delivering that air to the high pressure compressor 15 where further compression takes place.

The compressed air exhausted from the high-pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high, intermediate, and low-pressure turbines 17, 19a, 19 before being exhausted through the nozzle 20 to provide additional propulsive thrust. The high 17, intermediate 19a and low 19 pressure turbines drive respectively the high pressure compressor 15, intermediate pressure compressor 14 and fan 23, each by a suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

Functional performance of a given composition, or blend of fuel for use in a given mission, may be defined, at least in part, by the ability of the fuel to service the Brayton cycle of the gas turbine engine 10. Parameters defining functional performance may include, for example, specific energy; energy density; thermal stability; and, emissions including particulate matter. A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. Thus, in some examples, sustainable aviation fuels may comprise either or both of a density of between 90% and 98% that of kerosene and a calorific value of between 101% and 105% that of kerosene.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 4:
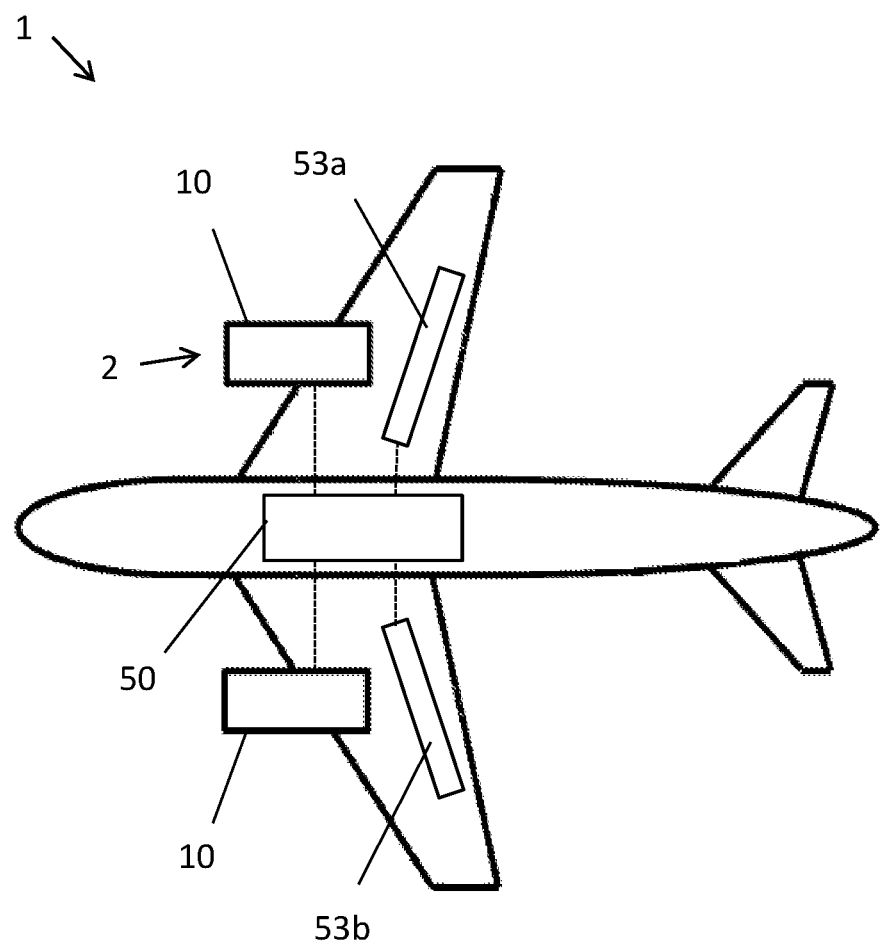
FIG. 4 shows an example aircraft comprising two gas turbine engines, which may be geared or direct-drive.

FIG. 4 shows an aircraft 1 with a propulsion system 2 comprising two gas turbine engines 10. The gas turbine engines 10 are supplied with fuel from a fuel supply system the aircraft 1. The fuel supply system of the examples pictured comprises a single fuel source 50, 53.

For the purposes of the present application the term "fuel source" means either 1) a single fuel tank or 2) a plurality of fuel tanks which are fluidly interconnected.

In the present examples, the first (and, in these examples, only) fuel source comprises a centre fuel tank 50, located primarily in the fuselage of the aircraft 1 and a plurality of wing fuel tanks 53a, 53b, where at least one wing fuel tank is located in the port wing and at least one wing fuel tank is located in the starboard wing for balancing. All of the tanks 50, 53 are fluidly interconnected in the example shown, so forming a single fuel source. Each of the centre fuel tank 50 and the wing fuel tanks 53 may comprise a plurality of fluidly interconnected fuel tanks. It will be appreciated that this tank arrangement is provided by way of example only, and is not limiting on the scope of this disclosure. For example, the wing tanks 53a, 53b may be fluidly interconnected with each other, but fluidly isolated from the centre fuel tank 50, providing two separate fuel sources, which may contain chemically distinct fuels.

Figure 5:
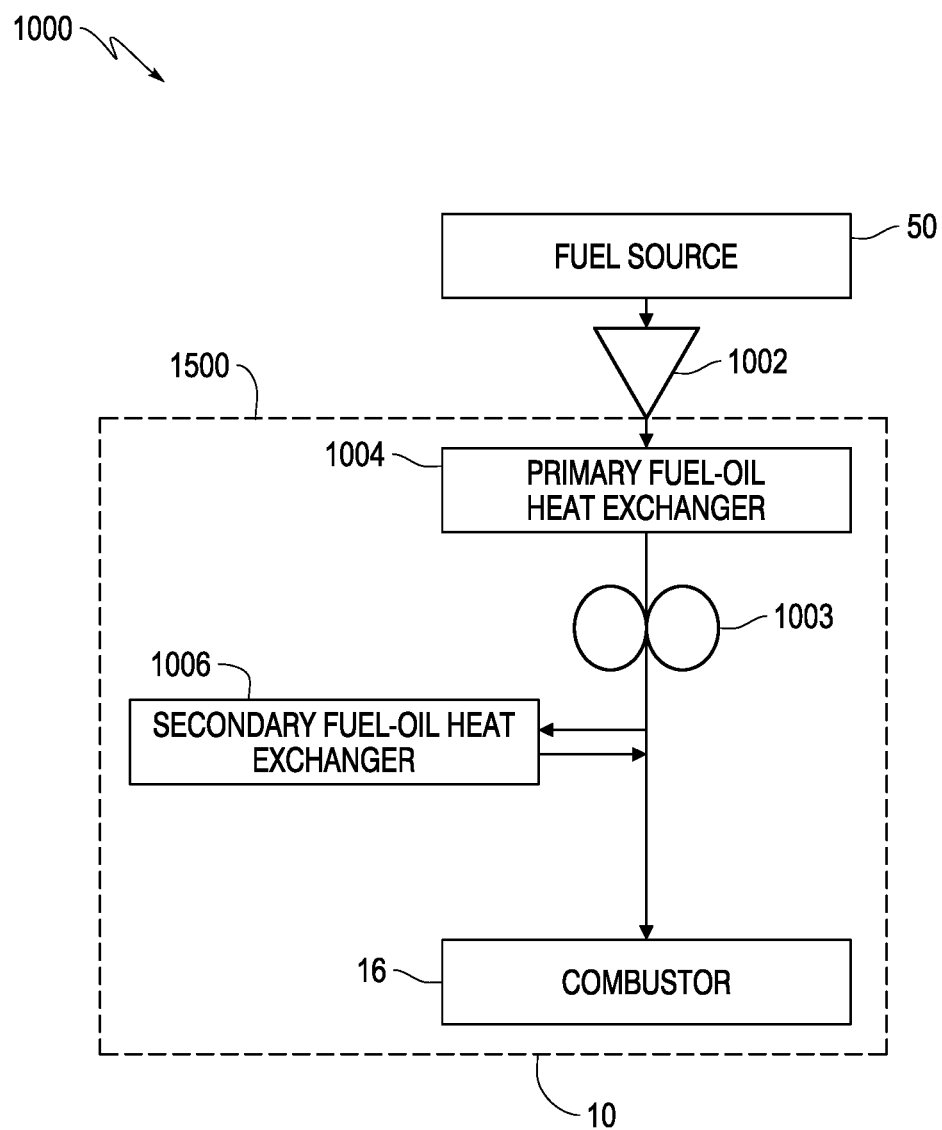
FIG. 5 is a schematic representation of an example fuel system.

An example fuel system 1000 comprising a fuel flow path from the fuel tank 50 to the combustor 16 of the gas turbine engine 10 of the aircraft 1 is shown schematically in FIG. 5.

Fuel system 1000 comprises both the fuel supply system (which supplies fuel to the engine) and the fuel management system 1500 (which operates within the engine) of the aircraft.

Fuel is pumped from the fuel tank 50 to the gas turbine engine 10 by a low pressure fuel supply pump 1002. The fuel then flows through a primary fuel-oil heat exchanger 1004 before being pumped by an engine fuel pump 1003. The engine fuel pump 1003 may be described as a main fuel pump. At least a portion of the fuel then flows through a secondary fuel-oil heat exchanger 1006 and at least a portion of the fuel flows to the combustor 16 without flowing through the secondary fuel-oil heat exchanger 1006. In the example shown in FIG. 5, from the secondary fuel-oil heat exchanger 1006 the portion of fuel that flowed therethrough then flows to the combustor 16 of the gas turbine engine 10. In other examples, the portion of fuel that flowed through the secondary fuel-oil heat exchanger 1006 may not be sent to the combustor, but may instead be returned to a fuel tank 50, optionally after use in one or more auxiliary systems.

The primary fuel-oil heat exchanger 1004 may be described as a main fuel-oil heat exchanger. The secondary fuel-oil heat exchanger 1006 may be described as a servo fuel-oil heat exchanger. The fuel management system 1500 is arranged so that the fuel reaches the primary fuel-oil heat exchanger 1004 before the secondary fuel-oil heat exchanger 1006.

The primary fuel-oil heat exchanger 1004 and the secondary fuel-oil heat exchanger 1006 are configured such that a flow of oil is also conveyed therethrough. The primary fuel-oil heat exchanger 1004 and secondary fuel-oil heat exchanger 1006 are configured such that heat may be transferred between the oil and the fuel flowing therethrough. At cruise conditions, the average temperature of the flow of oil entering the primary fuel-oil heat exchanger 1004 and the secondary fuel-oil heat exchanger 1006 is higher than the average temperature of the fuel entering the primary fuel-oil heat exchanger 1004 and the secondary fuel-oil heat exchanger 1006 respectively. In this way, the primary fuel-oil heat exchanger 1004 and the secondary fuel-oil heat exchanger 1006 are configured to transfer thermal energy from a flow of oil to a flow of fuel flowing therethrough at cruise conditions.

In the arrangement of the fuel management system 1500, the oil flows through the secondary fuel-oil heat exchanger 1006 prior to flowing through the primary fuel-oil heat exchanger 1004, and does not pass through any components that would cause it to gain heat between the secondary fuel-oil heat exchanger 1006 and the primary fuel-oil heat exchanger 1004. The oil is therefore hotter on entry to the secondary fuel-oil heat exchanger 1006 than on entry to the primary fuel-oil heat exchanger 1004. By contrast, the fuel flows through the primary fuel-oil heat exchanger 1004 prior to flowing through the secondary fuel-oil heat exchanger 1006. In this arrangement, the fuel temperature exiting the secondary fuel-oil heat exchanger 1006 is higher than the fuel temperature exiting the primary fuel-oil heat exchanger 1004. The engine fuel pump 1003 is placed upstream of the secondary fuel-oil heat exchanger 1006, meaning it is not exposed to these further elevated fuel temperatures.

The oil may flow through an air-oil heat exchanger (not shown) as well as through the primary and secondary fuel-oil heat exchangers 1004, 1006 if further heat loss from the oil is desired, beyond that to be taken by the fuel. For example, the oil may pass through the air-oil heat exchanger after passing through the secondary fuel-oil heat exchanger 1006 and before entering the primary fuel-oil heat exchanger 1004. The air-oil heat exchanger may be the only component (pipes aside) through which the oil passes between the secondary fuel-oil heat exchanger 1006 and the primary fuel-oil heat exchanger 1004. No air-oil heat exchanger may be provided in other examples. The oil may be returned to the bearings and/or other engine components it is used to lubricate and/or cool after leaving the primary heat exchanger 1004. The oil may be returned to an oil tank 2002, as described below, after leaving the primary heat exchanger 1004, or optionally after leaving the bearings and/or other engine components it is used to lubricate and/or cool, before then being returned to the secondary heat exchanger 1006.

Figure 6A:
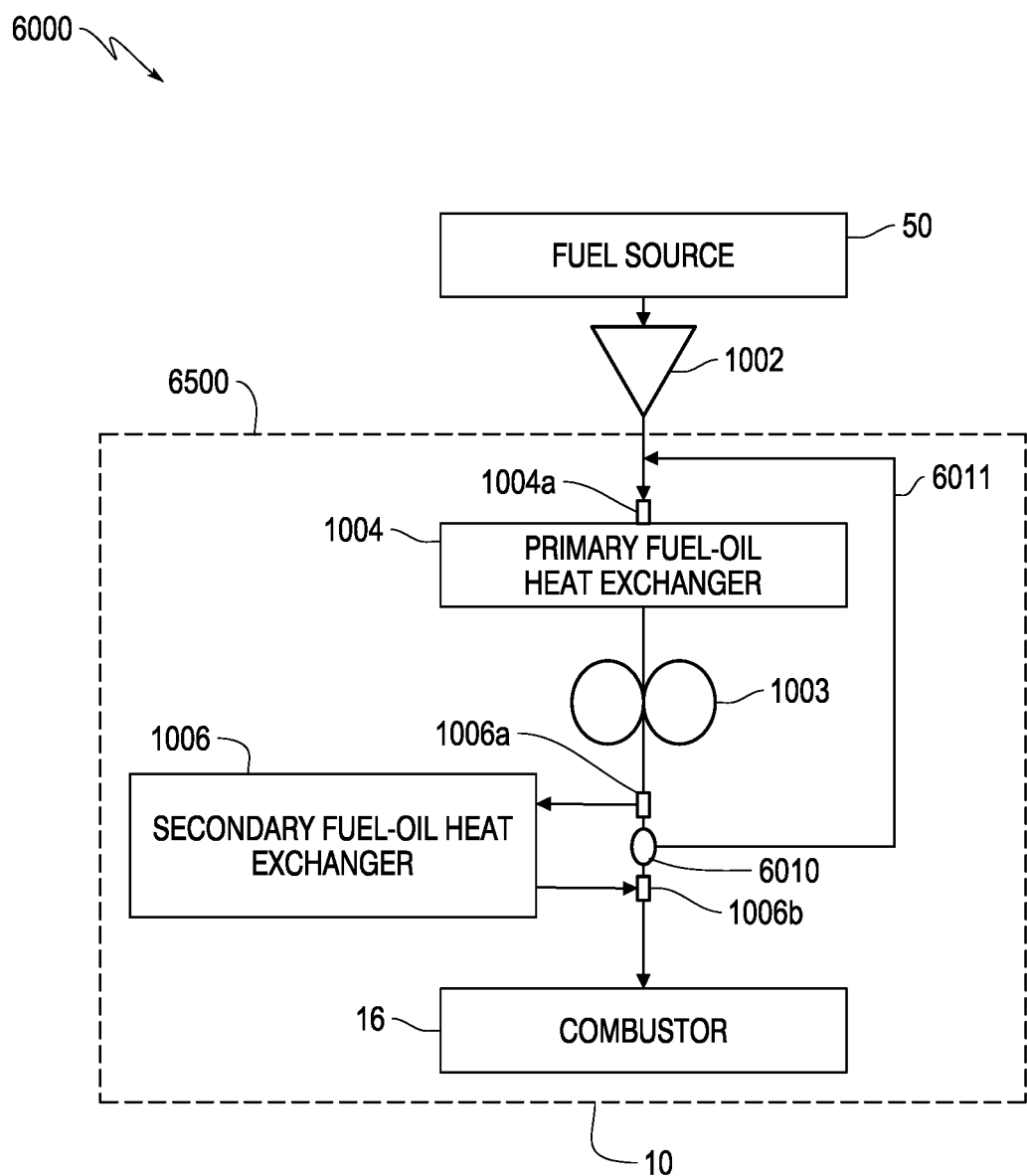
FIG. 6a is a schematic representation of an alternative example fuel system, including a fuel recirculation loop.

FIG. 6a shows an alternative example fuel system 6000, comprising a fuel supply system and fuel management system 6500 comprising a fuel flow path from the fuel tank 50 to the combustor 16 of the gas turbine engine 10 of the aircraft 1. As with fuel system 1000, fuel is pumped from the fuel tank 50 by the low pressure fuel supply pump 1002. The fuel then flows through a primary fuel-oil heat exchanger 1004 before being pumped by an engine fuel pump 1003. The engine fuel pump 1003 may be described as a main fuel pump.

Fuel system 6000 differs from fuel system 1000 in that fuel system 6000 comprises a recirculation valve 6010 located downstream of the primary fuel-oil heat exchanger 1004 and upstream of an outlet 1006b of the secondary fuel-oil heat exchanger 1006. In the illustrated example, the recirculation valve 6010 is located downstream of the pump 1003.

In the illustrated example, the recirculation valve 6010 is located downstream of the inlet 1006a of the secondary fuel-oil heat exchanger 1006, but upstream of the outlet 1006b. It is envisaged that the recirculation valve 6010 could be located upstream of the inlet 1006a of the secondary heat exchanger 1006 in other examples. The recirculation valve 6010 is arranged to allow a controlled amount of fuel which has already passed through the primary heat exchanger 1004 but which has not passed through the secondary heat exchanger 1006 to be returned to the inlet 1004a of the primary heat exchanger 1004. This provides a mechanism of controlling the fuel flow of the fuel system 6000. Controlling the fuel flow in the fuel system 6000 can work to provide desired characteristics of the fuel (such as temperature or amount of heat transferred away from the oil thereto) on entry to the combustor 16, and also to provide desired oil temperatures.

A pipe 6011, which may be referred to as a recirculation pipe as it transports fuel from one point along the main flow-path through the engine to a an earlier point along that flow-path so that it is required to flow along a section of the flow-path multiple times, may therefore be provided, leading from the recirculation valve to a point on the flow-path upstream of the inlet to the primary heat exchanger 1004. In the illustrated example, the bypass pipe 6011 returns the recirculated fuel to a point on the flow-path upstream of both the main pump 1003 and the primary heat exchanger 1004, such that the recirculated fuel passes through those components at least twice.

Figure 6B:
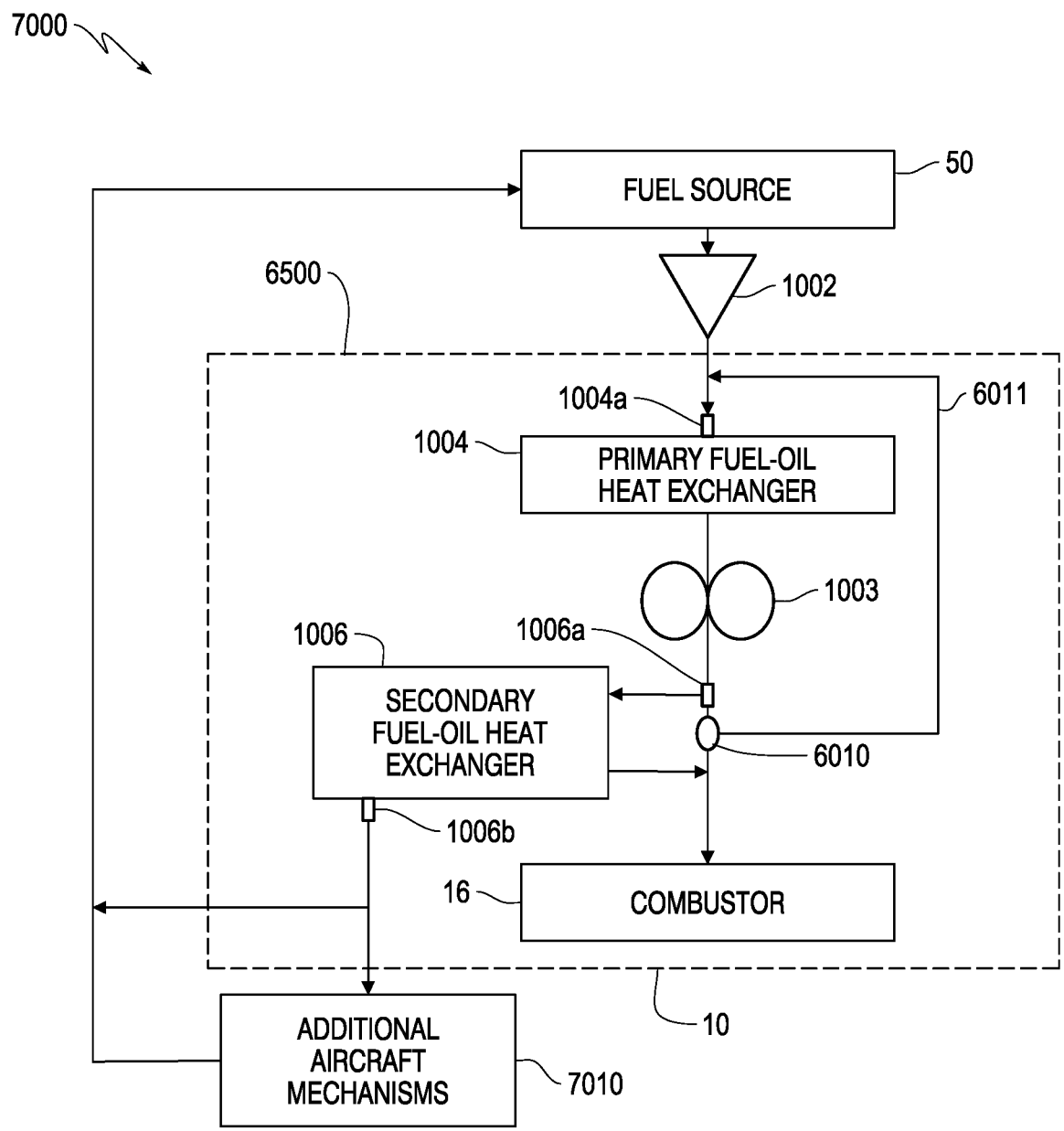
FIG. 6b is a schematic representation of a further alternative example fuel system similar to that shown in FIG. 6a but in which fuel passing through the secondary heat exchanger is not sent to the combustor.

FIG. 6b illustrates a further alternative example fuel system 7000. The fuel system 7000 is similar to fuel system 6000 and differs in that at least a portion of the fuel exiting the secondary fuel-oil heat exchanger 1006 is supplied to additional aircraft mechanisms 7010, and then returned to a tank 50 rather than flowing to the combustor 16. Any fuel not needed for these auxiliary systems 7010 may be returned straight to the tank 50. In other implementations, the fuel may be returned to a point on the fuel flow path just upstream of the pump 1002, instead of to the tank itself. These mechanisms 7010 may include one or more of a nacelle anti-icing system, actuators, and/or turbine case and/or blade cooling servo valves (as described below). At least a portion of the fuel exiting the secondary fuel-oil heat exchanger 1006 is returned to the fuel supply system (e.g. to the fuel tank 50 or the fuel supply pump 1002) for redistribution. In other implementations, fuel used in one or more such additional aircraft mechanisms 7010 may then be passed to the combustor 16 rather than returned to a tank 50.

Figure 6C:
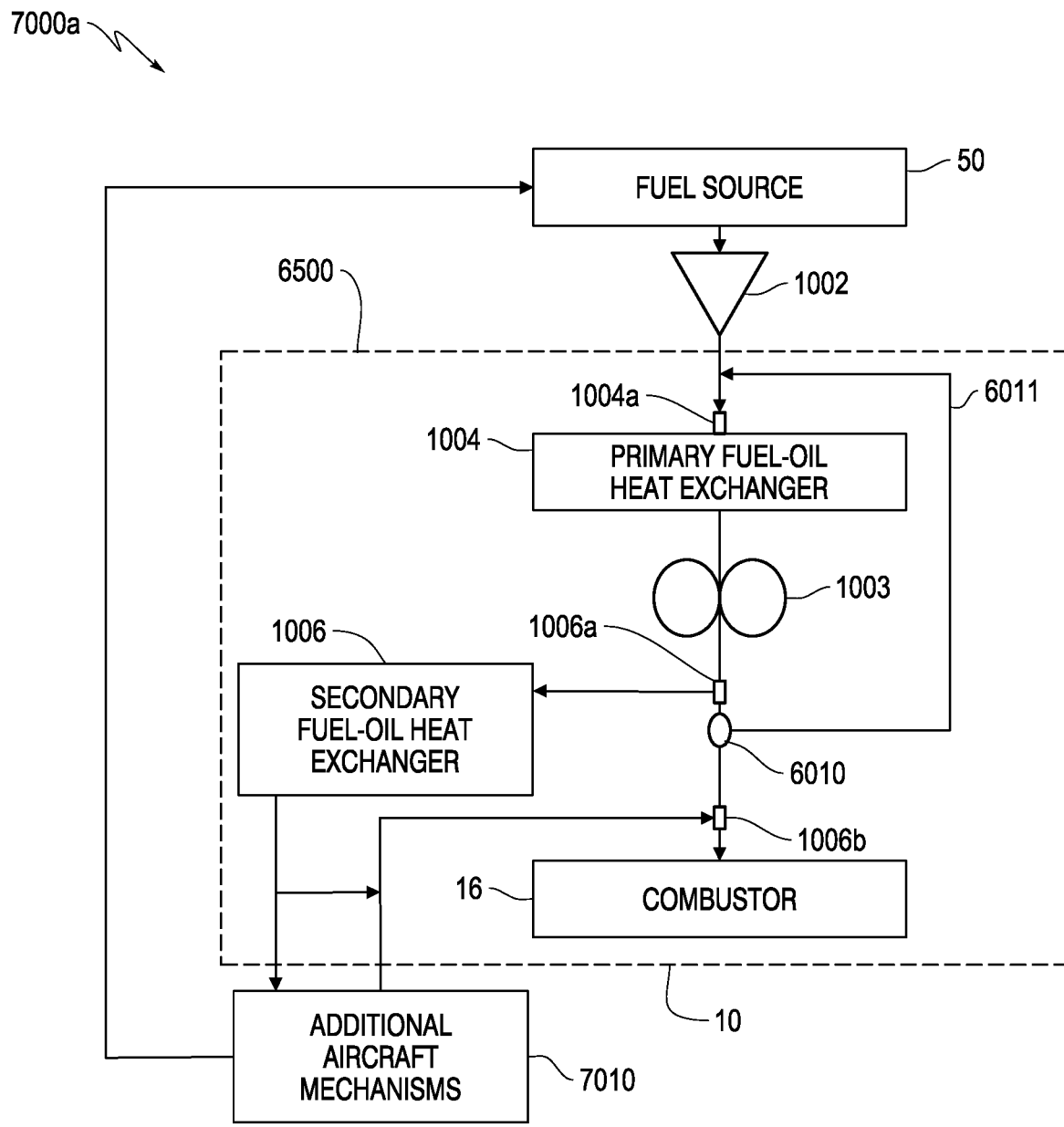
FIG. 6c is a schematic representation of a further alternative example fuel system similar to that shown in FIG. 6b but in which fuel passing through the secondary heat exchanger is returned to the combustor optionally after being used in one or more auxiliary systems.

FIG. 6c illustrates a further alternative example fuel system 7000a. The fuel system 7000a is similar to fuel system 7000 and differs in that the portion of the fuel exiting the secondary fuel-oil heat exchanger 1006 returned to join the main fuel flow on its approach to the combustor 16 after optionally being supplied to one or more additional aircraft mechanisms 7010 (which may be as described above). Any fuel not needed for these auxiliary systems 7010 may be returned straight to the main fuel flow path/combustor 16. At least a portion of the fuel exiting the secondary fuel-oil heat exchanger 1006 may be returned to the main fuel flow path without passing through the auxiliary systems 7010—the proportion directed to the auxiliary systems 7010 may be adjusted based on need. In other implementations, fuel used in one or more such additional aircraft mechanisms 7010 may then be returned to a tank 50 rather than sent to the combustor 16.

The aircraft 1 comprises a recirculating oil system arranged to supply oil to lubricate and remove heat from a plurality of components. An example of a closed loop oil system 2000 is shown schematically in FIG. 7. The recirculating oil system pictured in claim 7 comprises one closed loop oil system. In the example being described, a single closed loop oil system provides the entirety of the recirculating oil system—in alternative implementations, multiple fluidly separate closed loops may be used, optionally with chemically distinct oils and/or different oil flow rates.

The closed loop oil system 2000 comprises an oil tank 2002 suitable for containing a volume of oil. In some implementations, gasses are removed from oil within the oil tank 2002 by a de-aerator.

A feed pump 2004 is configured to pump oil from the oil tank 2002 to the secondary fuel-oil heat exchanger 1006. The average temperature of the oil entering the secondary fuel-oil heat exchanger 1006, at cruise conditions, is higher than the average temperature of fuel entering the secondary fuel-oil heat exchanger 1006. In the secondary fuel-oil heat exchanger 1006, thermal energy is transferred from the flow of oil to the flow of fuel. In this way, the average temperature of the flow of oil leaving the secondary fuel-oil heat exchanger 1006 is lower than the average temperature of the flow of oil entering the secondary fuel-oil heat exchanger 1006. Also in this way, the average temperature of the fuel leaving the secondary fuel-oil heat exchanger 1006 is higher than the average temperature of fuel entering the secondary fuel-oil heat exchanger 1006.

From the secondary fuel-oil heat exchanger 1006 the oil then flows to the primary fuel-oil heat exchanger 1004 (optionally via an air-oil heat exchanger, in some implementations). In the primary fuel-oil heat exchanger 1004, thermal energy is transferred from the flow of oil to the flow of fuel. In this way, the average temperature of the flow of oil leaving the primary fuel-oil heat exchanger 1004 is lower than the average temperature of the flow of oil entering the primary fuel-oil heat exchanger 1004. Also in this way, the average temperature of the fuel leaving the primary fuel-oil heat exchanger 1004 is higher than the average temperature of fuel entering the primary fuel-oil heat exchanger 1004. From the primary fuel-oil heat exchanger 1004, the flow of oil is then conveyed through the engine components 2006 it is used to cool and/or lubricate, such as shaft bearings. The oil acts as a lubricant and a coolant within the engine components 2006 and gains heat from the engine components 2006 during the process.

From the engine components 2006, the oil collects in the sump 2008. A scavenge pump 2010 is configured to pump oil from the sump 2008 back into the oil tank 2002.

Figure 7:
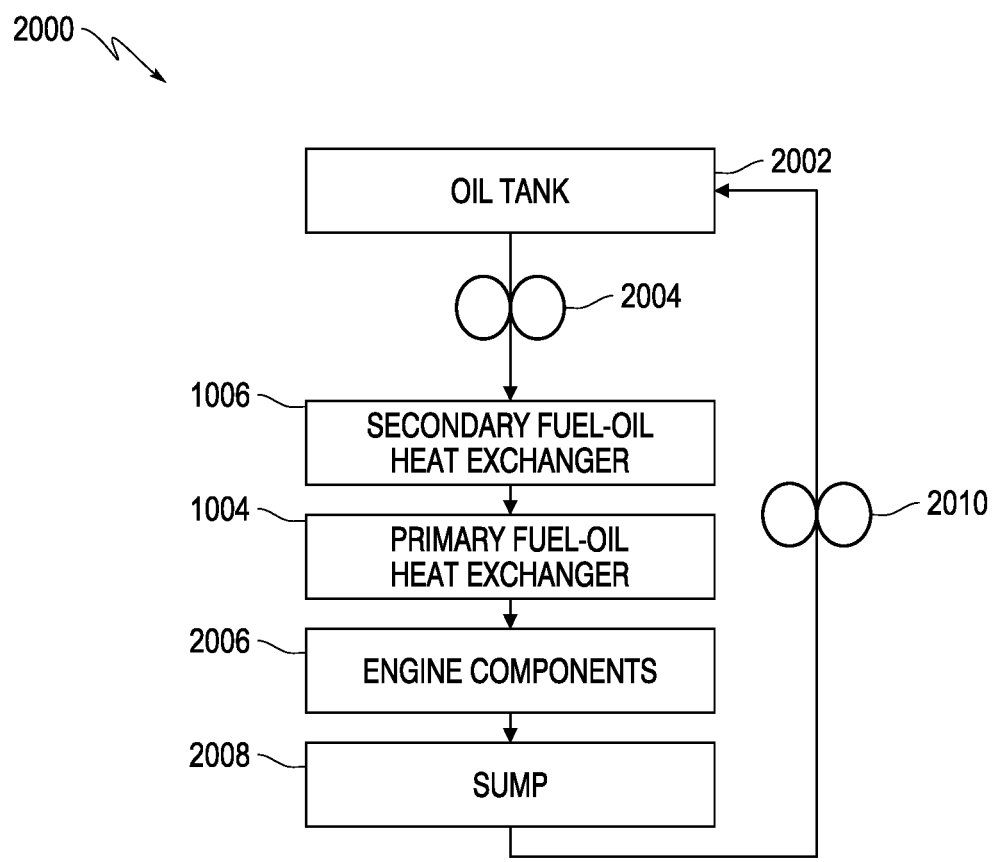
FIG. 7 is a schematic representation of an example recirculating oil system.
Figure 8:
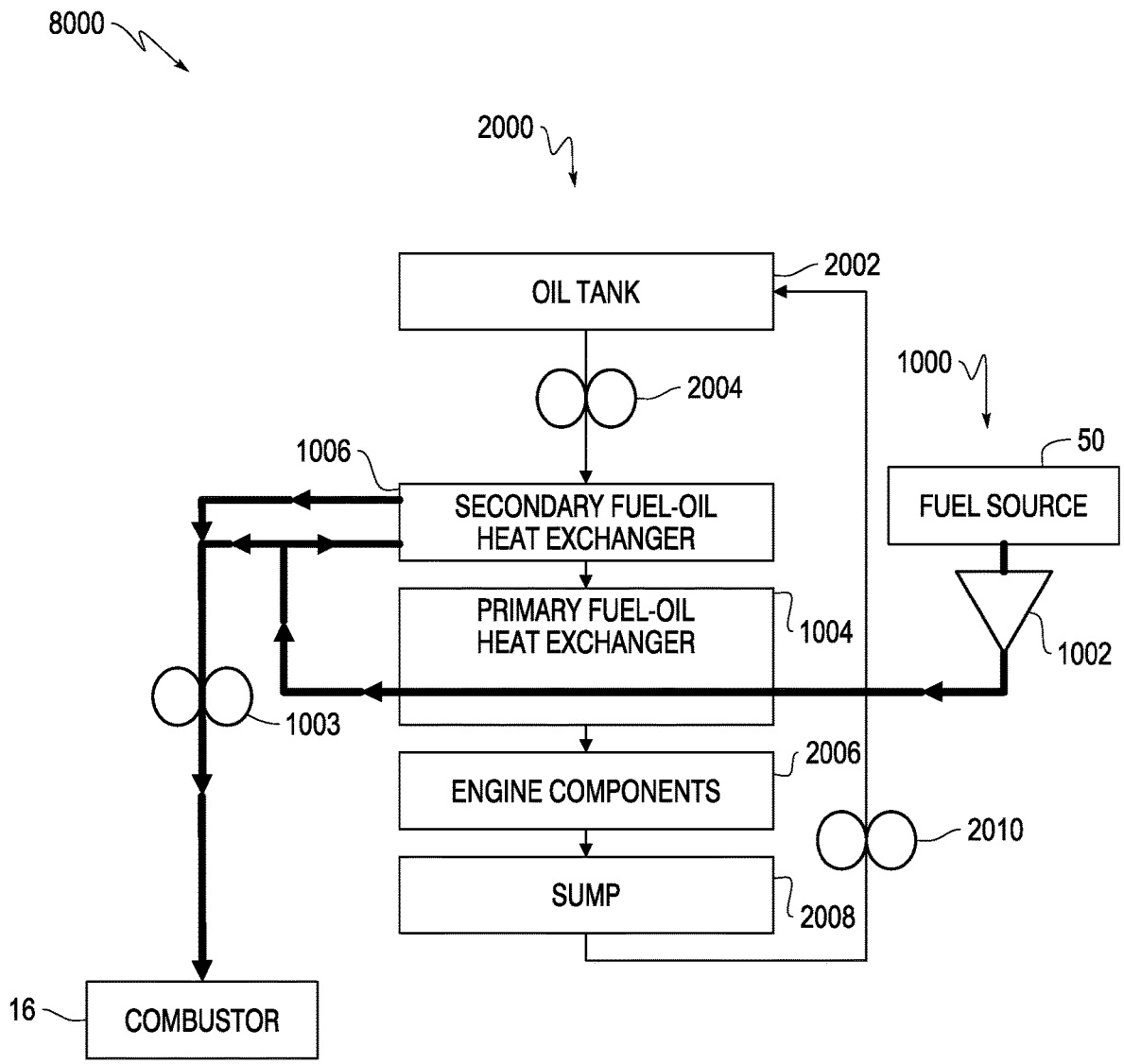
FIG. 8 is a schematic representation of a combination of the example fuel system of FIG. 5 and the example recirculating oil system of FIG. 7.

FIG. 8 shows schematically an example heat exchange system comprising the closed loop oil system 2000 of FIG. 7 and the fuel system 1000 of FIG. 5. The two systems 1000, 2000 are pictured together to illustrate the interactions between the fuel and oil flows within the gas turbine engine 10. Thick black lines indicate fuel flow, and thin black lines indicate oil flow.

Figure 9:
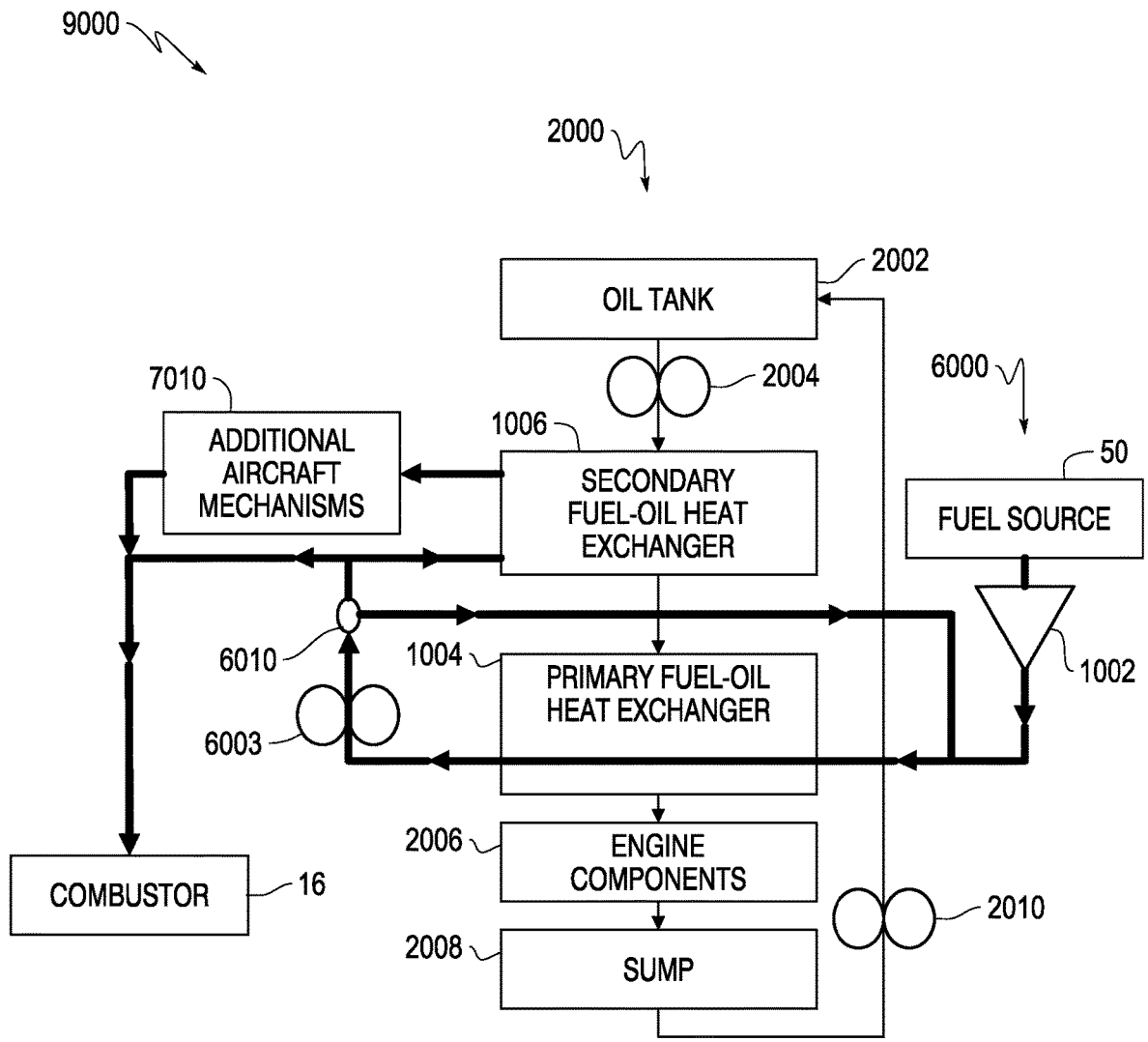
FIG. 9 is a schematic representation of a combination of the example fuel system of FIG. 6c and the example recirculating oil system of FIG. 7, with minor modifications.

FIG. 9 shows schematically an alternative example heat exchange system 9000, comprising the closed loop oil system 2000 of FIG. 7 and the fuel system 7000a of FIG. 6c including the recirculation loop 6010, 6011, but with the position of the recirculation valve 6010 differing slightly from that shown in FIG. 6c. In particular, the recirculating valve 6010 is located upstream of the fork in the fuel flow path to the secondary heat exchanger 1006, rather than being between the inlet to 1006a and outlet from 1006b that heat exchanger 1006. Thus in the implementation shown in FIG. 9, all of the fuel exiting the pump 1003 flows through the recirculation valve 6010, unlike in the implementation shown in FIG. 6c. Control methodology for the valve 6010 may be adjusted as appropriate. Again, thick black lines indicate fuel flow, and thin black lines indicate oil flow. FIG. 9 additionally includes the auxiliary systems 7010, which fuel may pass through after leaving the secondary fuel-oil heat exchanger 1006, demonstrating that these can use the fuel before it is then passed to the combustor 16 in some implementations.

The auxiliary systems 7010 include one or more turbine blade cooling servo valves 1902 in some implementations—these valves 1902 may be fueldraulic; using fuel to actuate them and are discussed below in more detail with respect to FIG. 19. In other implementations, these valves may be differently actuated (e.g. electronically, or with a different working fluid) instead of being fueldraulic. These valves 1902 may be used to modulate air flow to cool the turbine case and/or blades, and may therefore be described as modulating valves 1902.

The modulating valves 1902 may be used to control cooling air flow to a turbine 17, 19 of the gas turbine engine 10, using air from a compressor 14, 15 of the gas turbine engine.

Figure 19:
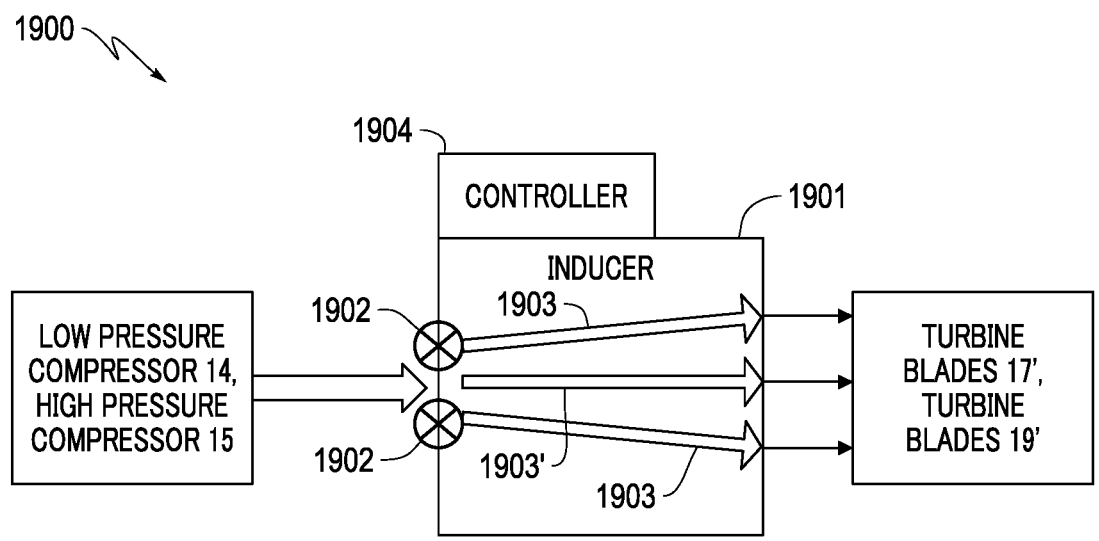
FIG. 19 is a schematic representation of a turbine cooling apparatus, which may be fueldraulically actuated.

FIG. 19 illustrates a turbine cooling apparatus 1900 comprising at least one modulating valve 1902. The turbine cooling apparatus 1900 comprises an inducer 1901 arranged to accelerate and direct the cooling air from the compressor 14, 15 onto the turbine blades 17', 19' of the turbine 17, 19.

The inducer 1901 may be an annular static inducer, and may accelerate the air flow in a substantially circumferential direction.

The inducer 1901 comprises a plurality of airflow passageways 1903 arranged to direct the air flow to particular places within the turbine 17, 19 to be cooled. The one or more modulating valves 1902 may be used to control cooling air flow into one or more of the passageways 1903. For example, multiple modulating valves 1902 may be provided and each modulating valve 1902 may control air access to, and flow through, a subset of the passageways. Some passageways 1903' may not be valve-controlled, such that they cannot be closed and air always flows through them in operation.

Each flow passageway 1903 comprises an inlet arranged to receive air from a compressor 14, 15 and an outlet arranged to direct that air onto the turbine 17, 19, and more specifically to a desired position on the turbine 17, 19 (e.g. a certain portion of the blades 17', 19', or across each entire blade). A single, larger, input flow from the compressor 14, 15 may therefore be converted into multiple smaller flows onto the turbine 17, 19. The narrowing of the flow area—from a less restricted space into the passageways 1903—may accelerate the flow.

The inducer 1901 of the implementation being described has an annular row of identical first and second flow passageways, optionally alternating around a circumference of the inducer, so forming two subsets of passageways. The cooling apparatus 1900 comprises a flow guide for directing a first portion of the air flow from the compressor 14, 15 to the inlets of the first subset of passageways 1903, and a second portion of the air flow from the compressor 14, 15 to the inlets of the second subset of passageways 1903'.

The modulating valves 1902 selectively modulate the first portion of the air flow.

A controller 1904 may be used to control the or each valve 1902 such that the flow through the first subset of passageways 1903 can be controlled—for example allowed to flow or blocked (binary control: on or off), or controlled across a range of different flow rate options. The control may be automatic, for example based on feedback from one or more temperature sensors to the controller 1904. In particular, air temperature at the inlet of the turbine 17, 19 to be cooled may be sensed (directly, or indirectly by calculation from other sensor data), and the control of the modulating valves 1902 may be performed based on that temperature—for example increasing air flow rate when the turbine inlet temperature rises above a set level.

It will be appreciated that the core airflow A enters the turbine 19 after leaving the combustor 16 (and also after passing through another turbine 17 in some implementations). On leaving the combustor 16, this core flow A comprises combustion products and potentially traces of unburned fuel as well as air but is referred to as an airflow for ease, and to avoid any potential confusion with fuel and oil flows. An average temperature of this airflow on entry to the turbine 19—i.e. the turbine inlet temperature for that turbine—therefore provides an indication of how hot the turbine blades 19' could get without cooling, and so can be used to guide the amount of cooling provided to the blades 19' of that turbine 19. Likewise, an inlet temperature for the higher-pressure turbine 17 may be used to guide an amount of cooling to be provided to the blades 17' of that turbine 17. One turbine inlet temperature may be used to guide the amount of cooling provided to the blades 19', 17' of multiple turbines in some implementations. The turbine inlet temperature of the highest-pressure turbine may be used in such implementations.

The same cooling apparatus 1900 may be used to cool multiple turbines 17, 19 in some implementations. In other implementations, each turbine 17, 19 may be provided with its own cooling apparatus 1900, or only some turbines 17, 19 may be cooled. Similarly, if multiple compressors 14, 15 are present, air from either or both may be used for turbine cooling.

In the example described above, a grouped subset of passageways can be controlled, but passageways 1903 cannot be individually controlled. In other implementations, individual passageway control may be provided, and/or more or fewer subsets of passageways may be defined.

In engines with multiple compressors and turbines, multiple such cooling apparatuses 1900 may be provided, optionally one for each turbine.

The inventors appreciated that the use of fuels different from the traditional kerosene-based jet fuels, such as sustainable aviation fuels, may result in different fuel properties, and that engine operation can be optimised for these different fuel properties. The sulphur content of the fuel should therefore be taken into account when considering heat transfer from the oil to the fuel, as sulphur content is linked to thermal stability of the fuel and a less thermally stable fuel can take less heat before performance issues arise whereas a more thermally stable fuel can take more heat and so be used for more efficient engine cooling.

Figure 10:
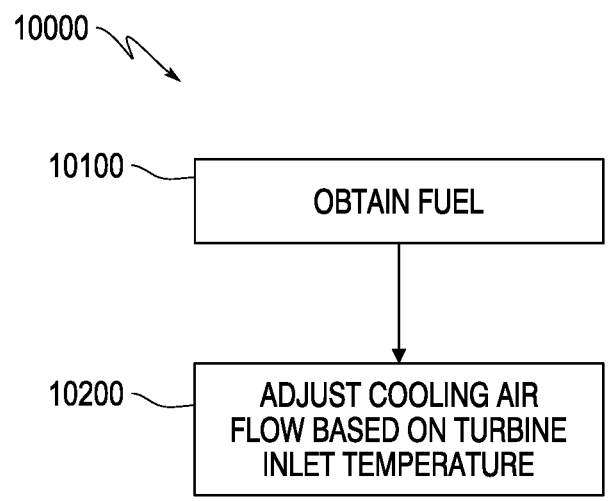
FIG. 10 illustrates an example method of operating a gas turbine engine, which may be a direct drive engine.

FIG. 10 illustrates an example method 10000 of operating a gas turbine engine 10, which may be a direct drive gas turbine engine 10. The method 10000 comprises the steps of:

Step 10100: Obtaining a fuel, wherein the fuel has a sulphur content of less than 30 ppm, for provision to the combustor 16 of the gas turbine engine 10, and optionally also to one or more auxiliary engine systems, at cruise.

The fuel may have a density in the range from 760-840 kg/m$^3$ at 15° C.

The fuel provided to the gas turbine engine 10 may therefore be provided to the combustor 16, or to one or more auxiliary engine systems 7010, or in some cases provided to the one or more auxiliary engine systems 7010 and then passed to the combustor 16 thereafter.

The selected fuel may have an aromatic content of less than 10% by volume.

Obtaining the fuel may comprise selecting a single fuel. Obtaining the fuel may alternatively comprise selecting a fuel mixture. The selected fuel may be the only fuel on board of the aircraft 1. As such, the selection of the fuel may be performed during refuelling of the aircraft 1. The selection 10100 may therefore be performed prior to take-off. Alternatively, the aircraft 1 may have multiple fuel sources and the selected fuel may be one of several fuels on board the aircraft 1, or a mixture of multiple fuels on board the aircraft. As such, the selection 10100 of the fuel may be performed during flight. The selection process may be automated. For example, an onboard controller may be configured to select and/or mix fuel(s) stored in one or more fuel tanks 50, 53 in order to provide a fuel with the desired properties. The controller may store the fuel properties and tank locations for the fuels on board and calculate the ratio of fuel mixing (which may include no mixing of fuels) in order to provide a fuel with the desired properties.

The gas turbine engine 10 comprises a turbine cooling apparatus 1900 comprising one or more modulating valves 1902 arranged to control the flow of cooling air to the turbine 17, 19.

Step 10200: Using the modulating valve to adjust the cooling air flow based on turbine inlet temperature.

The one or more modulating valves 1902 may be fueldraulic valves—i.e. the fuel provided to the gas turbine engine 10 may be used to actuate the one or more modulating valves 1902, as well as some (or all) of it being passed to the combustor 16.

The fuel density may be considered and selected as appropriate for use in the fueldraulic systems, and/or the fueldraulic systems may be adjusted to work with a fuel having the density selected based on combustion efficiency.

The inventors also appreciated that the use of fuels different from the traditional kerosene-based jet fuels, such as sustainable aviation fuels for example, may allow for more heat to be transferred from the oil to the fuel per unit volume of the fuel through the heat exchange system. Higher fuel temperatures on entry to the combustor may allow for improved fuel burn efficiency, and/or improved oil cooling, as described above.

Figure 11:
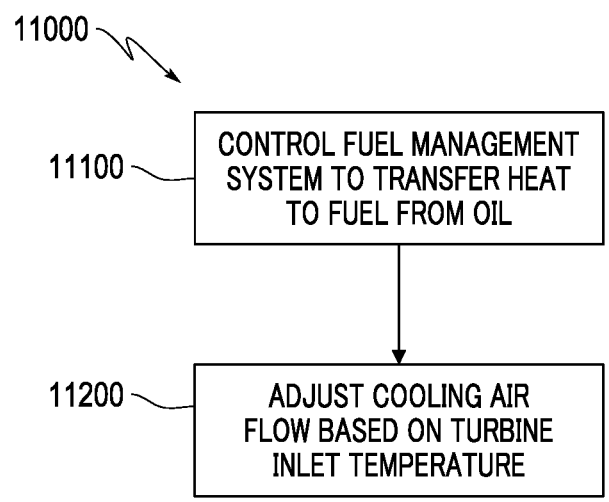
FIG. 11 illustrates a further example method of operating a gas turbine engine, which may be a direct drive engine.

FIG. 11 illustrates an example method 11000 of operating a gas turbine engine 10 comprising primary and secondary fuel-oil heat exchangers 1004, 1006. The gas turbine engine may be a direct drive gas turbine engine 10.

The method 11000 comprises the steps of:

Step 11100: Controlling the fuel management system so as to transfer between 200 and 600 kJ/m$^3$ of heat to the fuel from the oil in the primary fuel-oil heat exchanger at cruise conditions.

The fuel management system 1500 then provides some or all of the heated fuel to the combustor 16.

A total of 200-600 kJ/m$^3$ of heat may be transferred to the fuel from the oil as the fuel travels from a fuel tank to the combustor, at cruise conditions.

As discussed with respect to FIG. 5, the fuel management system 1500 comprises the primary fuel-oil heat exchanger 1004 and the secondary fuel-oil heat exchanger 1006 arranged to transfer heat to or from the fuel. An engine fuel pump 1003 is positioned downstream of the primary fuel-oil-heat exchanger 1004 and upstream of the secondary fuel-oil heat exchanger 1006. The fuel management system 1000 is arranged so that the fuel reaches the primary fuel-oil heat exchanger 1004 before the secondary fuel-oil heat exchanger 1006.

Heating the fuel to higher temperatures than previously used may improve the cooling of the oil before it is returned to the rest of the turbine engine, and/or may improve combustion efficiency of the fuel. The positioning of the secondary fuel-oil heat exchanger 1006 after the engine fuel pump may facilitate obtaining higher fuel temperatures without compromising fuel pump longevity, as the highest-temperature fuel does not need to pass through the pump 1003. The reduced maximum temperature to which the pump 1003 is exposed may reduce creep, reduce deposition of thermal decomposition products of the fuel within the pump (which can result in blockages, so resulting in deterioration in delivery flow over the life of the pump), reduce thermal damage to components such as seals, and/or reduce damage over cycling resulting from different thermal expansions of different pump components, so extending pump life/improving pump performance for a given pump age. In addition, bearing film thickness in the pump 1003 may be improved if temperatures of fuel in the pump are kept lower by placing the pump before a further heat exchanger. Fuel is the lubricant for the pump bearings, and fuel viscosity generally reduces as temperature increases, so deleteriously reducing film thickness. Reducing the fuel temperature may therefore result in an increase in the viscosity of the fuel, which generally enhances the performance of the bearing surfaces inside the pump 1003, so reducing wear and hence reducing deterioration in flow delivery with time. In addition, lower fuel temperatures generally reduce the formation of fuel breakdown products which also have a detrimental effect on the life and reliability of the pump 1003. The lower fuel temperature may therefore also increase reliability. The lower temperature may also reduce damage to journal bearings and thrust bearings. Other relevant factors include variation in cavitation (cooler fuel is denser and has a lower vapour pressure) and lubricity; cooler fuel is beneficial from the volumetric pump output perspective, so a pump 1003 may be kept on-wing longer/may have a longer useful lifespan if used with cooler fuel.

Controlling the fuel management system may comprise controlling oil flow and/or fuel flow through the primary and secondary fuel-oil heat exchangers 1004, 1006, for example using one or more bypass pipes or recirculation loops 6010, 6011 as described above.

In various implementations as discussed above, the controlling 11100 the fuel management system may comprise controlling fuel flow through the primary and secondary fuel-oil heat exchangers 1004, 1006.

Fuel flow may be controlled using a recirculation valve 6010 where present. An actively controlled amount of fuel leaving the primary heat exchanger 1004 may be recirculated to the primary heat exchanger 1004 rather than flowing directly to the combustor 16. This recirculation may also take fuel which has already passed through the engine fuel pump 1003 back to a position upstream of the engine fuel pump 1003.

Alternatively or additionally, fuel flow may be controlled by using one or more bypass pipes arranged to allow a proportion of the fuel to avoid passing through either or both fuel-oil heat exchangers.

The speed of the pump 1003 may also be adjusted, either speeding up fuel flow rate (so reducing heat transfer per unit volume passing through the heat exchangers) or reducing fuel flow rate (so increasing heat transfer per unit volume passing through the heat exchangers).

The controlling 11100 the fuel management system may comprise controlling oil flow through the primary and secondary fuel-oil heat exchangers 1004, 1006, and/or through one or more other heat exchangers—e.g. an oil-oil heat exchanger 2030 between separate closed loop oil systems, in engine architectures with multiple closed loop oil systems, or an air-oil heat exchanger 2020.

Additionally or alternatively, as for fuel flow, oil flow may be controlled using one or more bypass pipes, where present, allowing oil to bypass one or more heat exchangers 1004, 1006 instead of flowing therethrough. Oil may also be recirculated in some implementations, and/or oil flow rate may be adjusted by controlling one or more oil pumps.

The heat exchange system may comprise a controller arranged to implement this control. The controller may receive inputs from one or more temperature sensors, and may control one or more valves, and/or the pump 1003, based on the received data.

The active control of fuel and/or oil flow rates may be performed based on one or more parameters such as:

Core shaft speed and engine thrust demand;
Current fuel temperature and/or oil temperature at one or more locations;
Fuel calorific value;
Fuel viscosity;
Fan rotational speed;
Fuel flow rate to the combustor (commonly referred to as WFE—Weight of Main Engine Fuel Flow); and
Main/engine fuel pump speed, or speed options.

In alternative examples, the control of the amount of fuel leaving the primary heat exchanger 1004 to be recirculated may not be an active method step—instead, a set, fixed, proportion of the fuel may be recirculated. Alternatively, no fuel may be recirculated, and no recirculation route may be available in some implementations.

Step 11200: Using the modulating valve to adjust the cooling air flow based on turbine inlet temperature.

As for the method 10000 described above, the one or more modulating valves 1902 may be fueldraulic valves—i.e. the fuel provided to the gas turbine engine 10 may be used to actuate the one or more modulating valves 1902, as well as some (or all) of it being passed to the combustor 16.

The fuel density may be considered and selected as appropriate for use in the fueldraulic systems, and/or the fueldraulic systems may be adjusted to work with a fuel having the density selected based on combustion efficiency.

The method of FIG. 11 may be used in conjunction with the method of FIG. 10.

The methods 10000, 11000 described above were described primarily with respect to a direct-drive gas turbine engine 10, but it will be appreciated that they could be implemented for a geared gas turbine engine 10, with appropriate adjustments to the oil system (e.g. addition of a further closed loop to lubricate and cool a gearbox 30).

In other engine architectures, the engine may be differently-designed, for example being a geared engine instead of a direct-drive engine. FIGS. 12-17 and 20 and the description thereof below illustrate example arrangements of a geared engine, although it will be appreciated that many of the features and options could be equally applied to a direct drive engine, with the exception of features relating to the main gearbox 30. Use of the same reference numerals indicates equivalent features.

Figure 12:
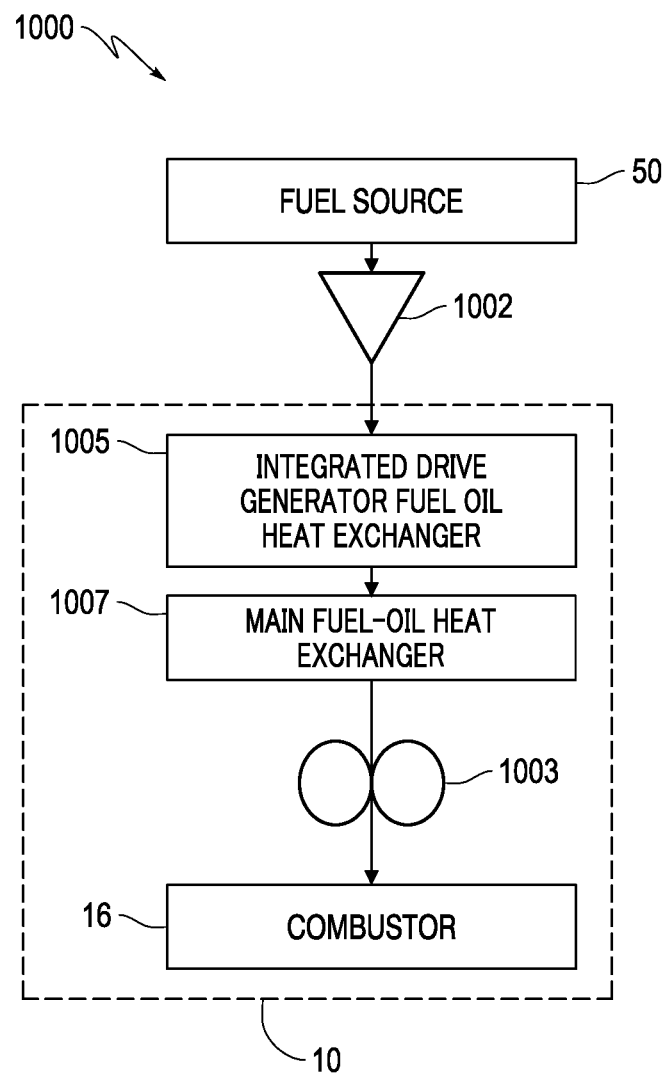
FIG. 12 is a schematic representation of an example fuel system, which may be for a geared engine.

An example fuel system 1000 comprising a fuel flow path from the fuel tank 50 to the combustor 16 of the gas turbine engine 10 of the aircraft 1 is shown schematically in FIG. 12. The fuel system 1000 comprises both the fuel supply system arranged to supply fuel from the fuel source 50, 53 (as described above) to each engine 10, and a fuel management system within the engine arranged to supply the provided fuel to the combustor 16. The fuel management system manages fuel temperature as well as fuel flow, directing the fuel via one or more heat exchangers of the engine's heat exchange system.

Fuel is pumped from the fuel tank 50 towards the gas turbine engine 10 by a low pressure fuel pump 1002. The fuel flows from the fuel tank 50 through an integrated drive generator (IDG) fuel-oil heat exchanger 1005 before flowing through a main fuel-oil heat exchanger 1007. The two heat exchangers 1005, 1007 form part of the engine's heat exchange system.

The first heat exchanger the fuel reaches may have oil used to lubricate and/or cool one or more components of an integrated drive generator 2006 passing therethrough, therefore being described as an integrated drive generator fuel-oil heat exchanger 1005.

The second heat exchanger the fuel reaches may have oil used to lubricate and/or cool a main gearbox 30 of the gas turbine engine 10 passing therethrough, therefore being described as a main fuel-oil heat exchanger.

From the main fuel-oil heat exchanger 1007 the fuel is pumped by the engine fuel pump 1003 to the combustor 16 of the gas turbine engine 10, where it is burned to power the gas turbine engine 10.

In the implementation being described, the main fuel-oil heat exchanger 1007 and the IDG fuel-oil heat exchanger 1005 are configured such that a flow of fuel is conveyed therethrough. In general, at least the majority of the fuel supplied to the engine 10 passes though both heat exchangers 1005, 1007, although each heat exchanger 1005, 1007 may be provided with a bypass to allow some of the fuel to avoid passing through the respective heat exchanger.

In general, at least the majority of the fuel which passes through the IDG fuel-oil heat exchanger 1005 also passes through the main fuel-oil heat exchanger 1007, along a single flow path. The two heat exchangers 1005, 1007 may therefore be described as being in series with each other, with respect to fuel flow. The IDG fuel-oil heat exchanger 1005 and the main fuel-oil heat exchanger 1007 are configured such that a flow of oil is also conveyed through each—the oil flowing through one is different from the oil flowing through the other in the implementation being described, although it will be appreciated that the same oil may flow through one fuel-oil heat exchanger and then through another fuel-oil heat exchanger in other implementations. The two heat exchangers 1005, 1007 are therefore in separate closed loop systems 2000, 2000', with respect to oil flow, in the implementation being described.

The IDG fuel-oil heat exchanger 1005 and the main fuel-oil heat exchanger 1007 are each configured such that heat may be transferred between the oil flowing therethrough and the fuel flowing therethrough. At cruise conditions, the average temperature of the flow of oil entering the main fuel-oil heat exchanger 1007 and of oil entering the IDG fuel-oil heat exchanger 1005 is higher than the average temperature of the fuel entering the main fuel-oil heat exchanger 1007 and the IDG fuel-oil heat exchanger 1005 respectively. In this way, the main fuel-oil heat exchanger 1007 and the IDG fuel-oil heat exchanger 1005 are configured to transfer thermal energy from a flow of oil to a flow of fuel flowing therethrough at cruise conditions.

The aircraft 1 comprises a recirculating lubrication and/or cooling system arranged to supply oil to lubricate and/or remove heat from a plurality of components. It will be appreciated that the relative importance of lubrication and cooling may vary for different aircraft components and for different flight stages, and that the recirculating lubrication and/or cooling system may be simply referred to as a recirculating lubrication system for brevity. The recirculating lubrication system, in some examples, comprises one closed loop oil system or two separate closed loop oil systems as mentioned above.

Figure 13:
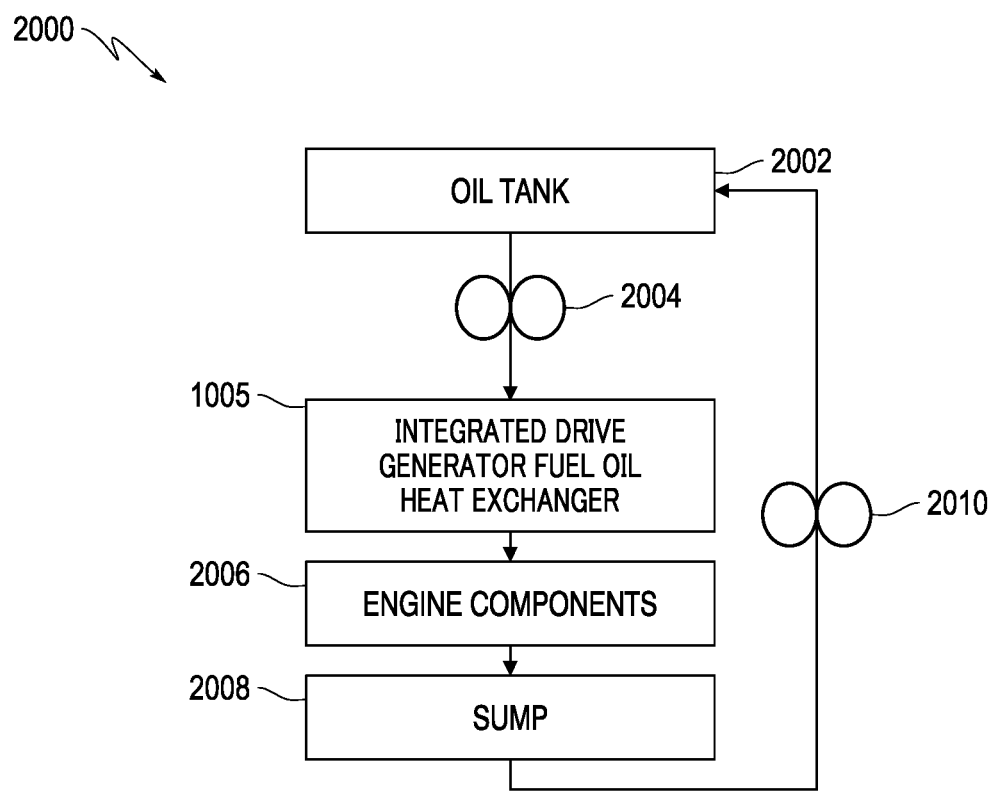
FIG. 13 is a schematic representation of a portion of a first closed loop of an example recirculating lubrication system.

An example of a first closed loop oil system 2000 is shown schematically in FIG. 13. It will be appreciated that such a first closed loop oil system 2000 may additionally comprise other components not shown in FIG. 13 or described herein, and that only the key components with respect to the features being described are described and shown. The skilled person will therefore appreciate that the various diagrams of closed-loop systems shown and described herein are not intended to be limiting on the presence of other components in those loops.

The closed loop oil system 2000 comprises an oil tank 2002 suitable for containing a volume of oil. In some implementations, gasses are removed from oil within the oil tank 2002 by a de-aerator.

A feed pump 2004 is configured to pump oil from the oil tank 2002 to the IDG fuel-oil heat exchanger 1005. The average temperature of the oil entering the IDG fuel-oil heat exchanger 1005, at cruise conditions, is higher than the average temperature of fuel entering the IDG fuel-oil heat exchanger 1005. In the IDG fuel-oil heat exchanger 1005, thermal energy is transferred from the flow of oil to the flow of fuel. In this way, the average temperature of the flow of oil leaving the IDG fuel-oil heat exchanger 1005 is lower than the average temperature of the flow of oil entering the IDG fuel-oil heat exchanger 1005. Also in this way, the average temperature of the fuel leaving the IDG fuel-oil heat exchanger 1005 is higher than the average temperature of fuel entering the IDG fuel-oil heat exchanger 1005.

The flow of oil is then conveyed to/back to an integrated drive generator 2006, where it lubricates moving components and is heated up in the process. In some implementations, the oil may be used primarily as a coolant for the IDG 2006, and may do minimal or no lubrication.

From the integrated drive generator 2006, the oil collects in a sump 2008. A scavenge pump 2010 is configured to pump oil from the sump 2008 back into the oil tank 2002, ready for re-use.

Figure 14:
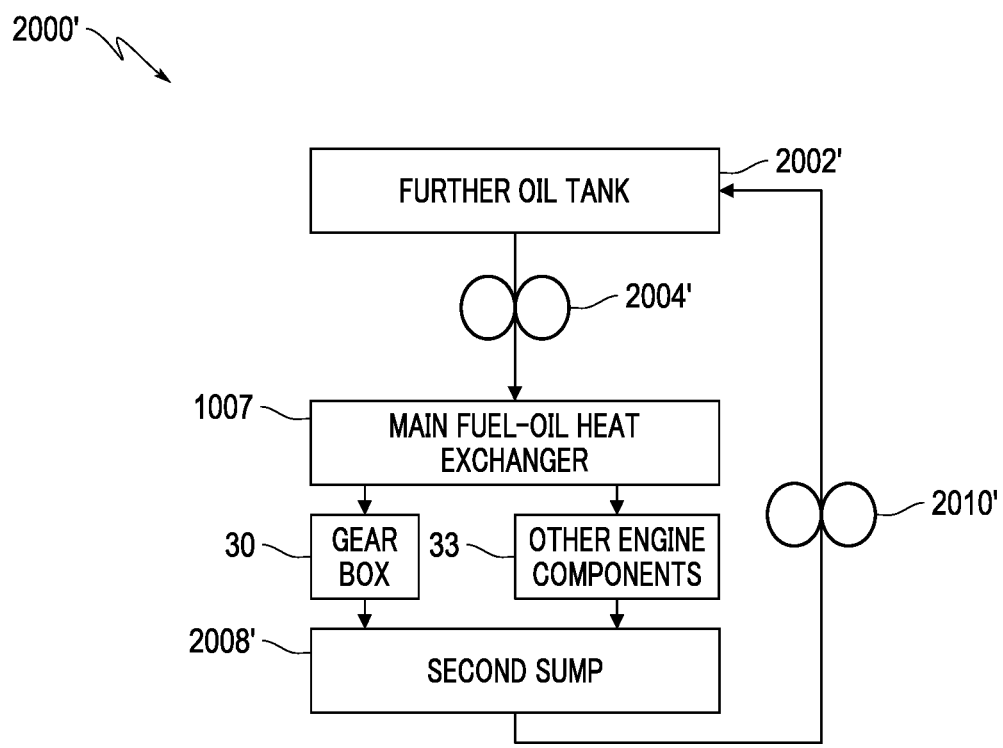
FIG. 14 is a schematic representation of a portion of a second closed loop of an example recirculating lubrication system, which may be used in conjunction with the first closed loop shown in FIG. 13.

A second closed loop oil system 2000' as shown in FIG. 14 comprises a further oil tank 2002' suitable for containing a volume of oil. In some implementations, gasses are removed from oil within the oil tank 2002' of the second closed loop system by a de-aerator.

A second feed pump 2004' is configured to pump oil from the oil tank 2002' of the second closed loop oil system to the main fuel-oil heat exchanger 1007. The average temperature of the oil entering the main fuel-oil heat exchanger 1007, at cruise conditions, is higher than the average temperature of the fuel entering the main fuel-oil heat exchanger 1007. In the main fuel-oil heat exchanger 1007, thermal energy is transferred from the flow of oil to the flow of fuel. In this way, the average temperature of the oil leaving the main fuel-oil heat exchanger 1007 is lower than the average temperature of the oil entering the main fuel-oil heat exchanger 1007, so it is cooled before re-use as a lubricant, allowing the cooled oil to remove more heat from the system to be lubricated. Also in this way, the average temperature of the fuel leaving the main fuel-oil heat exchanger 1007 is higher than the average temperature of fuel entering the main fuel-oil heat exchanger 1007.

The flow of oil is then conveyed to a power gearbox 30, which may also be described as a main gearbox 30 of the gas turbine engine 10, and generally also to other engine components 33 including an auxiliary gearbox (AGB) and one or more bearing chambers.

The flow of oil may be split into two or more parallel flows, for example one flow through the main gearbox 30 and one flow through the other engine components 33, or multiple parallel flows through the main gearbox 30 (e.g. via different components of the gearbox) and separate flows through the AGB 33 and the or each bearing chamber 33.

The power gearbox 30 is arranged to receive an input from the core shaft and to output drive to the fan via the fan shaft 42, and therefore may comprise or have associated therewith one or more bearings to support the shafts, which may be journal bearings. In addition, the gearbox 30 has gears therewithin, and may have one or more journal bearings associated with the gears therewithin, which may also need lubrication and/or cooling. The oil may be used to lubricate the journal bearings and/or gears, and generally increases in temperature significantly in use at cruise conditions, so assisting with cooling the bearings and/or gears as the flow of oil transports heat away from them.

It will be appreciated that the main gearbox 30 may comprise multiple different components to be lubricated—e.g. gears (and e.g. more specifically gear teeth which mesh) and also one or more journal bearings within the gearbox 30. A more complex implementation of this second closed loop oil system 2000' arranged to allow differing oil flows to different gearbox components is described below with respect to FIG. 20.

The engine components 33 cooled, and optionally also lubricated, by the oil flow generally comprise an AGB 33. The AGB, also known as an accessory drive, is a gearbox that forms part of the gas turbine engine 10, although is not a part of the engine's core 11 and does not drive the fan 23. The AGB instead drives the engine accessories, e.g. fuel pumps, and generally handled large loads. A relatively large amount of heat may therefore be dumped into the oil from the AGB. One or more bearing chambers may be lubricated by the same oil, and may similarly dump heat into the oil. Per unit of oil flowing therethrough, the AGB and bearing chambers 33 may add more heat to the oil than the main gearbox 30 does in most implementations.

For example, in various implementations at cruise conditions, the exit temperature of oil from the power gear box 30 may be a maximum of 160° C., and optionally in the range from 100° C. to 160° C. By contrast, oil leaving the AGB and/or the various bearing chambers 33 may have a temperature in the range from 160° C. to 220° C. In implementations in which the flow does not split, the oil may flow through the main gearbox 30 before entering the AGB 33. One or more valves may be provided to control oil flow split.

Turning back to FIG. 14, from the power gearbox 30 and other engine components 33, the oil collects in a second sump 2008'. The sump 2008' may be a single sump, or may be composed of a plurality of separate sumps, for example as described in more detail below with respect to FIG. 20. A second scavenge pump 2010' is configured to pump oil from the second sump 2008' back into the oil tank 2002' of the second closed loop oil system, ready for re-use. Similarly to the sump(s), multiple scavenge pumps may be used in some implementations.

Figure 15:
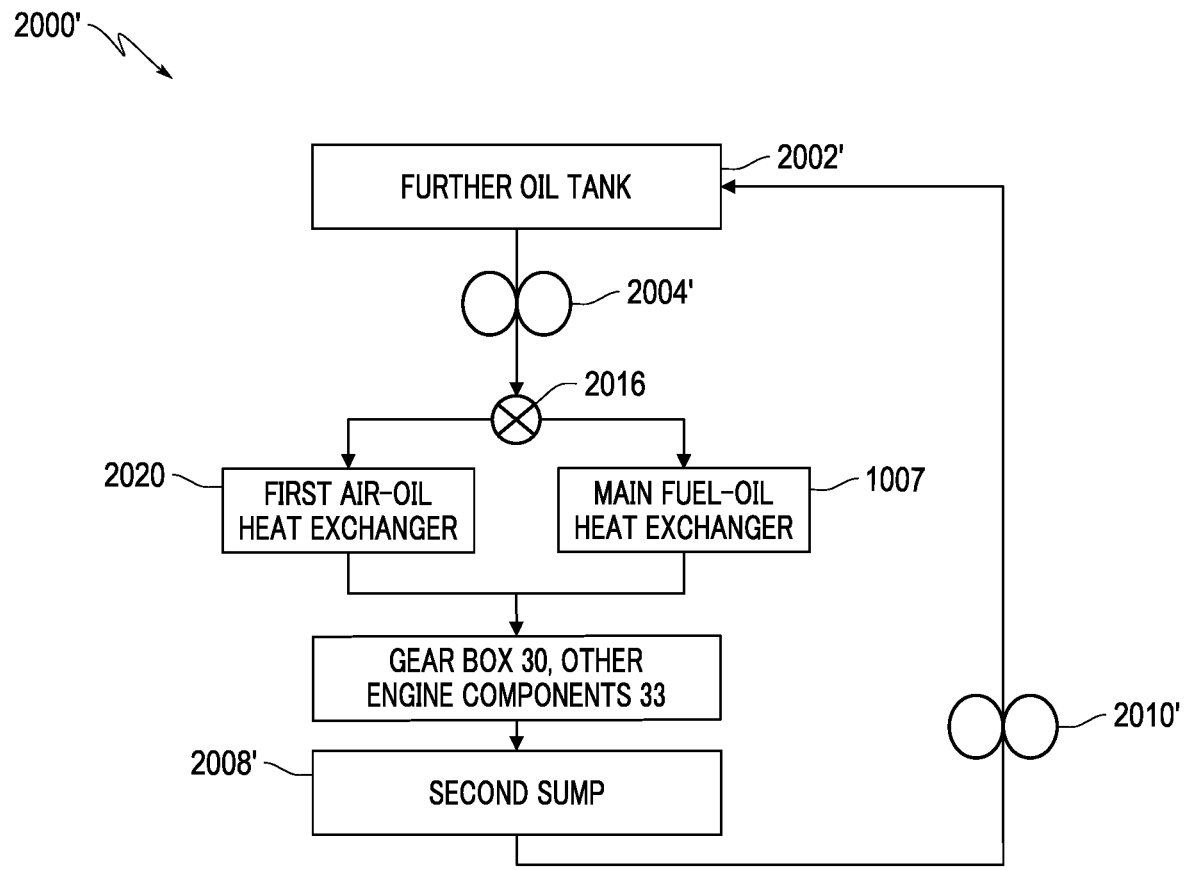
FIG. 15 is a schematic representation of a portion of an alternative second closed loop of an example recirculating lubrication system.

FIG. 15 shows schematically an alternative example section of the second closed loop oil system 2000' shown in FIG. 14. In this section a flow of oil is pumped by the feed pump 2004' through a valve 2016. The valve 2016 is operable to split the flow of oil between both the main fuel-oil heat exchanger 1007 and a first air-oil heat exchanger 2020, where the first air-oil heat exchanger 2020 is arranged in parallel with the main fuel-oil heat exchanger 1007. The branched oil flow may re-join thereafter, before the oil is sent to the gearbox 30 and other engine components 33 to be cooled and/or lubricated. The recombined flow of oil is then conveyed to the power gearbox 30 and other engine components 33 to be cooled and/or lubricated. In various examples, an oil-oil heat exchanger (not shown) may be arranged in series with/on the same branch of the parallel arrangement as the first air-oil heat exchanger 2020. The oil-oil heat exchanger may allow for heat exchange between the first and second closed loop oil systems 2000, 2000'.

Any suitable percentage of oil may flow through each of the first air-oil heat exchanger 2020 and the main fuel-oil heat exchanger 1007. In some examples, the valve 2016 is operable to vary the flow of oil to the main fuel-oil heat exchanger 1007 and the first air-oil heat exchanger 2020.

It will also be appreciated that in various implementations any of the fuel-oil heat exchangers 1005, 1007 may be arranged in series or in parallel with one or more air-oil heat exchangers.

Figure 16:
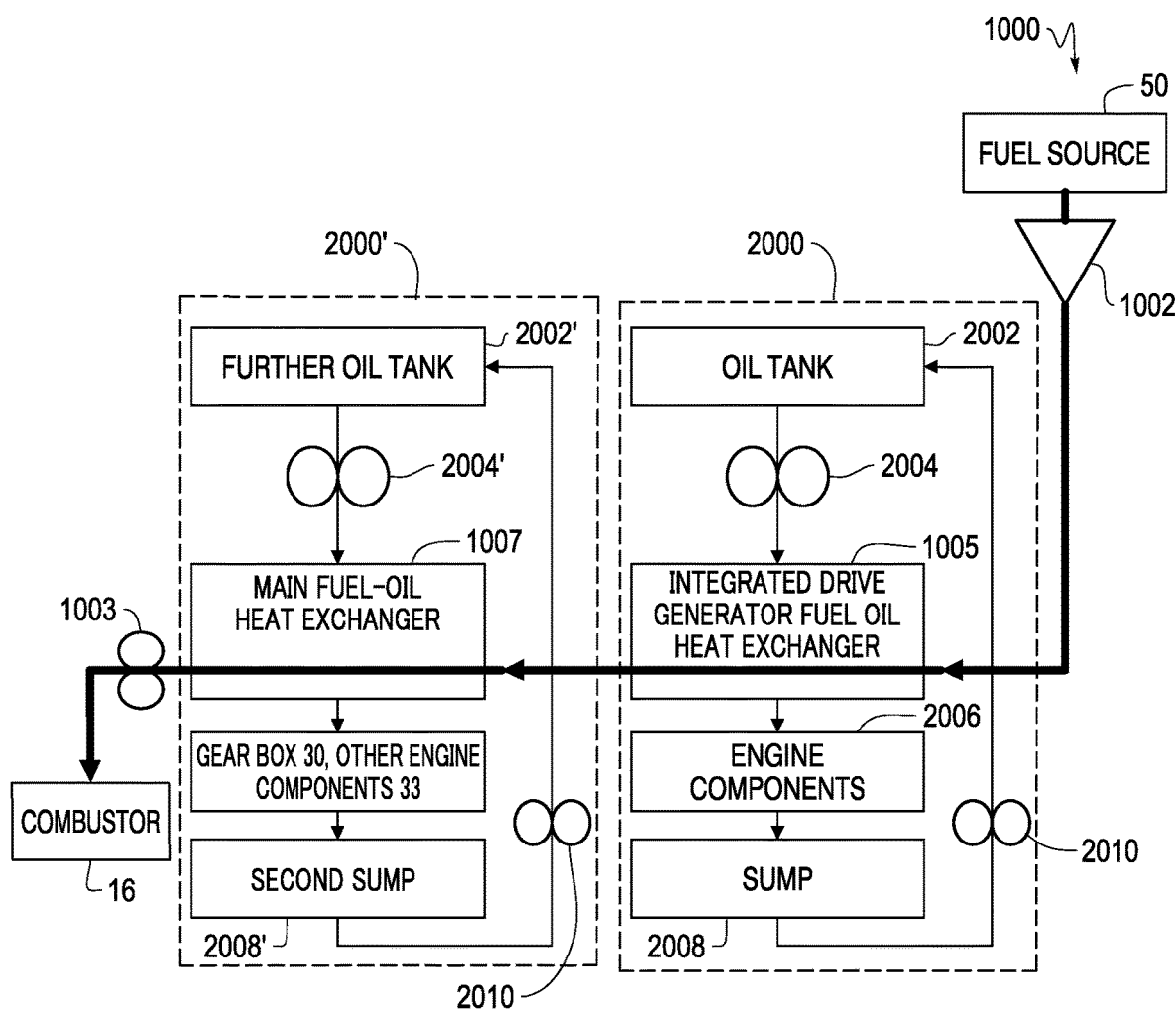
FIG. 16 is a schematic representation of an example fuel system interacting with an example recirculating lubrication system.

FIG. 16 shows schematically an example arrangement and interaction of the first closed loop oil system 2000, second closed loop oil system 2000' and fuel system 1000, with fuel flow shown in a thick black line and oil flow shown in a thinner black line.

The first closed loop oil system 2000 of this example arrangement is arranged as shown in FIG. 13. The second closed loop oil system 2000' of this example arrangement is arranged as shown in FIG. 14. The fuel system 1000 of this example arrangement is arranged as shown in FIG. 12.

In use, fuel is pumped from the fuel tank 50 by the low pressure fuel pump 1002. The fuel then flows through the IDG fuel-oil heat exchanger 1005. The first closed loop oil system 2000 is configured such that the recirculating flow of oil also flows through the IDG fuel-oil heat exchanger 1005.

At cruise conditions, the average temperature of the flow of oil entering the IDG fuel-oil heat exchanger 1005 is higher than the average temperature of the flow of fuel entering the IDG fuel-oil heat exchanger 1005. The IDG fuel-oil heat exchanger 1005 is configured such that heat is transferred from the flow of oil to the flow of fuel. In this way, the average temperature of the flow of oil on exit from the IDG fuel-oil heat exchanger 1005 is lower than the average temperature of the flow of oil on entry to the IDG fuel-oil heat exchanger 1005. In the same way, the average temperature of the flow of fuel on exit from the IDG fuel-oil heat exchanger 1005 is higher than the average temperature of the flow of fuel on entry to the IDG fuel-oil heat exchanger 1005.

The fuel then flows through the main fuel-oil heat exchanger 1007. The second closed loop oil system 2000' is configured such that the recirculating flow of oil also flows through the main fuel-oil heat exchanger 1007.

At cruise conditions, the average temperature of the flow of oil entering the main fuel-oil heat exchanger 1007 is higher than the average temperature of the flow of fuel entering the main fuel-oil heat exchanger 1007. The main fuel-oil heat exchanger 1007 is configured such that heat is transferred from the flow of oil to the flow of fuel. In this way, the average temperature of the flow of oil on exit from the main fuel-oil heat exchanger 1007 is lower than the average temperature of the flow of oil on entry to the main fuel-oil heat exchanger 1007. In the same way, the average temperature of the flow of fuel on exit from the main fuel-oil heat exchanger 1007 is higher than the average temperature of the flow of fuel on entry to the main fuel-oil heat exchanger 1007.

At cruise conditions, the average temperature of the flow of oil flowing through the IDG fuel-oil heat exchanger 1005 may be lower than the average temperature of the flow of oil flowing through the main fuel-oil heat exchanger 1007. In this way, the fuel passes through the heat exchanger having a lower average oil flow temperature first, before passing through the heat exchanger having a higher average oil flow temperature.

After flowing through the main fuel-oil heat exchanger 1007, the fuel flows to the combustor 16 of the gas turbine engine 10, pumped by the engine fuel pump 1003.

In some examples, the heat transferred from the oil to the fuel before it reaches the combustor 16 may raise the fuel temperature to an average of at least 135° C., 140° C., 150° C., 160° C., 170° C., 180° C., 190° C., or 200° C. on entry to the combustor 16 at cruise conditions.

In some examples, the heat transferred from the oil to the fuel may raise the fuel temperature to an average of between 135-150° C., 135-160° C., 135-170° C., 135-180° C., 135-190° C., or 135-200° C. on entry to the combustor 16 at cruise conditions.

The fuel temperatures on entry to the combustor at cruise conditions may be defined as an average over at least 5 minutes, and optionally over ten minutes, under steady state cruise conditions. The use of average temperatures avoids the temperature measurement being unduly skewed by any transient spikes in temperature, which may be defined as fluctuations in temperature of the fuel during operation, often elevation of the temperature. Each fluctuation may not last more than 5 minutes. A fuel temperature of at least 135° C. on entry to the combustor at cruise conditions therefore requires the fuel temperature to remain at or above 135° C. over a period of time, and a brief transient spike to a temperature above 135° C. is not sufficient.

Optionally, one or more additional heat sources may be used to warm the fuel to reach the desired temperature, alongside the oil-fuel heat transfer.

In some examples, the heat transferred to the fuel from the oil before the fuel reaches the combustor 16 may be 200-600 kJ/m³ at cruise conditions.

Figure 17:
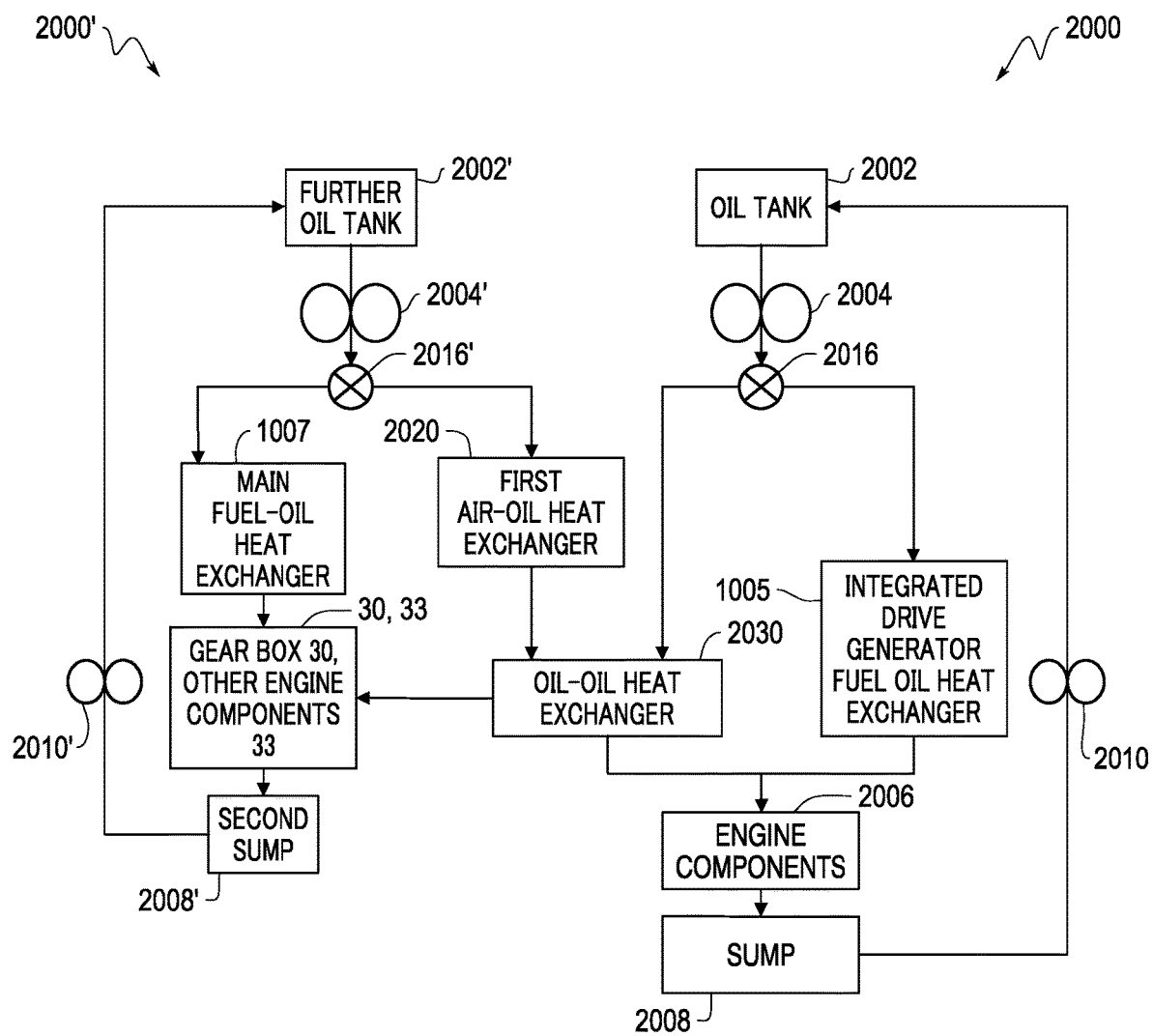
FIG. 17 is a schematic representation of a portion of an example recirculating lubrication system.

FIG. 17 shows schematically an example configuration of the first closed loop oil system 2000 and the second closed loop oil system 2000' where the two independent recirculating flows of oil are brought into a heat exchange relationship through an oil-oil heat exchanger 2030.

In the example shown in FIG. 17, the first closed loop oil system 2000 is configured such that the recirculating flow of oil is pumped by the feed pump 2004 through a valve 2016. The valve 2016 is operable to split the flow of oil between the IDG fuel-oil heat exchanger 1005 and the oil-oil heat exchanger 2030, the oil-oil heat exchanger being arranged in parallel with the IDG fuel-oil heat exchanger 1005.

In various examples, any suitable portion of the flow of oil may be diverted between the IDG fuel-oil heat exchanger 1005 and the oil-oil heat exchanger 2030. In such examples, the valve 2016 may be operable to divert a fixed portion of the flow of oil to each of the IDG fuel-oil heat exchanger 1005 and the oil-oil heat exchanger 2030. Alternatively, the valve 2016 may be operable to divert a variable portion of the flow of oil to each of the IDG fuel-oil heat exchanger 1005 and the oil-oil heat exchanger 2030.

In alternative implementations, the IDG fuel-oil heat exchanger 1005 and the oil-oil heat exchanger 2030 may be in series, and the first closed loop oil system 2000 may not branch.

After flowing through the heat exchangers, the flow of oil is then conveyed to the integrated drive generator 2006 and then to the sump 2008. The scavenge pump 2010 then pumps the oil from the sump 2008 to the oil tank 2002, for re-use.

The flow of oil within the first closed loop oil system 2000 is arranged to be brought into a heat exchange relationship with the separate flow of oil within the second closed loop oil system 2000' through the oil-oil heat exchanger 2030. In the oil-oil heat exchanger 2030 the flow of oil within the first closed loop oil system 2000 does not mix with the flow of oil within the second closed loop oil system 2000'. The oil-oil heat exchanger 2030 is configured such that a transfer of heat may take place between the two separated flows of oil. In this way, heat from a hotter flow of oil may be transferred to the cooler flow of oil within the oil-oil heat exchanger 2030.

The second closed loop oil system 2000' is configured such that the recirculating flow of oil is pumped by the second feed pump 2004' through a second valve 2016', where the oil flow branches. The second valve 2016' is operable to split the flow of oil between the main fuel-oil heat exchanger 1007 and a first air-oil heat exchanger 2020, where the first air-oil heat exchanger 2020 is in series with the oil-oil heat exchanger 2030 on the same branch, such that the air-oil heat exchanger 2020 and oil-oil heat exchanger 2030 arrangement is arranged in parallel with the main fuel-oil heat exchanger 1007. Additional air-oil heat exchangers may be present in some implementations.

In various examples, any suitable portion of the flow of oil may be diverted between the main fuel-oil heat exchanger 1007 and the first air-oil heat exchanger 2020. In such examples, the second valve 2016' may be operable to divert a fixed portion of the flow of oil to each of the main fuel-oil heat exchanger 1007 and the first air-oil heat exchanger 2020. Alternatively, the second valve 2016' may be operable to divert a variable portion of the flow of oil to each of the main fuel-oil heat exchanger 1007 and the first air-oil heat exchanger 2020.

After flowing through the heat exchangers, the flow of oil is then conveyed to the power gearbox and other engine components 33 (generally including an AGB) and then to the second sump 2008'. The second scavenge pump 2010' then pumps the oil from the second sump 2008' to the oil tank 2002' of the second closed loop oil system 2000', for re-use.

FIG. 20 illustrates a more complex implementation of the second closed loop oil system 2000', where the oil used to cool the main gearbox 30 is controlled so as to specifically target different gearbox components.

In particular, the gearbox comprises gears 28, 32, 38, and also journal bearings 44 associated with one or more of the gears.

The recirculating lubrication (and/or cooling) system 2000a' of the examples currently being described is arranged to provide cooler oil to the journal bearings 44 than to the gears 32.

In the implementation shown, the feed pump 2004' pumps oil from the main oil tank 2002' in two different directions, with a portion of the oil going through the parallel arrangement of heat exchangers 2020, 1007 described above, and the remainder instead going via a bypass pipe 2005, so missing the heat exchangers 2020, 1007 (it will be appreciated that one or more additional or alternative unshown heat exchangers may be present in this heat exchange arrangement—for example an IDG fuel-oil heat exchanger 1005 as described above). The oil passing through the bypass pipe 2005 is therefore hotter than the oil passing through the parallel heat exchange arrangement 2020, 1007 as it has not had the opportunity to lose heat to the fuel and/or air. A valve 2005a may be provided to directly control the bypass flow in some implementations. The valve 2005a can be actively controlled, together with valve 2016' which is operable to split the flow of oil between the main fuel-oil heat exchanger 1007 and the first air-oil heat exchanger 2020, based on control rules and output from one or more temperature sensor(s), for example. Alternatively, the valve 2005a may be a passive valve (e.g. a thermostatic valve). In other implementations, a separate valve 2005a may not be provided, and instead the valve 2016' may be a more complex valve that splits oil flow between heat exchangers 1007, 2020 and the bypass 2005. For example, a single valve that controls the split between the three routes (two parallel heat exchangers, and a bypass route) may have a different fixed percentage of opening of a port that allows oil flow to go through the bypass pipe 2005 for each given split between the first air-oil heat exchanger 2020 and the main fuel-oil heat exchanger 1007. Having two separately-controllable valves 2005a, 2016' may however provide more flexibility.

A valve 2005a operable to vary the proportion of the flow of fuel directed along the bypass pipe 2005 versus the proportion of the flow of fuel that proceeds into the one or more heat exchangers 1007,2020 may therefore be provided in various implementations to control cooling. In some implementations, a one-way valve may additionally be provided where the bypass pipe rejoins the flow of oil to the gears 28, 32, 38, to prevent back-flow. As the bypass flow may generally be at a higher pressure than the flow which has been through the heat exchangers 2020, 1007, the one-way valve may serve to prevent the bypassed flow from travelling the wrong way along the pipes and inadvertently reaching the journal bearings 44.

The recirculating lubrication system 2000a' is generally similar to the second closed loop system 2000' shown in FIG. 15, but additionally comprises a ring gear scavenger pump 38a arranged to pump used oil away from the ring gear 38 of the gearbox 30, and a second (auxiliary) oil tank 2008b' arranged to receive the oil gathered from the ring gear 38 by the ring gear scavenger pump 38a. The oil from the second (auxiliary) oil tank 2008b' is sent to re-enter the journal bearings 44 directly, bypassing the heat exchangers 1005, 1007 and the main tank 2002'. The second oil tank 2008b' is therefore arranged to supply oil to the journal bearings only.

The sump 2008a' collects oil from the other components of the gearbox 30, and acts as the sump 2008' of the example shown in FIG. 15. From that sump 2008a', some of the oil is returned to the main oil tank 2002', but the rest of the oil is sent to re-enter the journal bearings 44 directly, bypassing the heat exchangers 1005, 1007 and the main tank 2002', in the implementation shown. A dedicated pump 2011' may be provided to pump oil from the sump 2008a' to the journal bearings 44. In alternative implementations, the pump 38a may be differently located, and may be fed from the ring gear 38 and/or from the sump 2008a', so returning oil from both the ring gear 38 and the sump 2008a' to the journal bearings 44.

In still other implementations, all of the oil in the sump 2008a' may be returned to the main tank 2002'.

The main tank 2002', and also the sump 2008a' (indirectly via its connection to the main tank 2002'), therefore supplies oil to both the gearbox gears 28, 32, 38 and the gearbox journal bearings 44, whereas the auxiliary tank 2008b' supplies oil to the gearbox journal bearings 44 only.

All of the uncooled oil from the main tank 2002'—i.e. the oil that passes through the bypass pipe 2005 instead of through the heat exchange arrangement and is therefore warmer—is sent to the gears 28, 32, 38, mixed with a percentage of the cooled oil. The percentage of the cooled oil sent to the gears 28, 32, 38 may be controllable, optionally automatically based on a temperature feedback loop using sensor data from one or more temperature sensors. One or more additional valves and/or pumps may be provided to facilitate this control. In general, none of the uncooled oil from the main tank 2002' goes to the power gear box journal bearings 44 in the implementations being described, at least not at cruise conditions. Instead, a percentage of the cooled oil, along with some oil from the sump 2008a' and some from the auxiliary oil tank 2008b', is sent to the journal bearings 44 in the implementation shown. In alternative implementations, only cooled oil from the parallel heat exchange arrangements may be sent to the journal bearings 44, and all oil from the sump 2008a' and from the auxiliary oil tank 2008b' may be returned to the main tank instead of recirculated around the gearbox 30.

The second closed loop 2000a' is therefore arranged to provide cooler oil to the journal bearings 44 than to the gears 28, 32, 38. This may allow for more efficient cooling overall, by cooling a smaller amount of oil to the lowest desired temperature and using warmer oil where that is sufficient for the intended purpose/component(s), as discussed above.

In various implementations, additional features and branches in the oil system may be present. For example, the oil supply pipe 2007 to the gears 28, 32, 38 of the main, power gearbox 30 may branch and also supply oil to an accessory gearbox (AGB) and/or to one or more shaft bearings 33. An additional auxiliary oil tank, or sump, 2008c', may collect oil leaving these engine components, and an additional pump 2012' which may be a scavenge pump, may send that used oil back to the main oil tank 2002'. Additionally or alternatively, a portion of the oil from the main tank 2002'—optionally of the uncooled oil before it reaches the heat exchange arrangement or the bypass pipe 2005—may be taken off to cool one or more other engine components—e.g. a vibration damping device for a shaft. In such implementations, the accessory gearbox cooling, shaft bearing cooling, and/or the vibration damping device cooling may result in the hottest oil temperatures—for example, oil temperature on leaving the accessory gearbox cooling and/or the vibration damping device may be around 180° C. or higher, whereas oil leaving the power gearbox may be at around 130° C.

After mixing in the main tank 2002', the uncooled oil from the main tank 2002' may have a temperature of around 140° C. As such, oil leaving the main gearbox 30/recirculated around the main gearbox 30 without returning to the main tank 2002' may be cooler (e.g. by around 10° C.) than oil leaving the main tank 2002'. Oil passing through the heat exchangers may have its temperature drop to around 80° C.

To supply oil to the gearbox journal bearings 44, a portion of this cooled oil may be mixed with the uncooled oil from sump 2008a' and/or the auxiliary tank 2008b' so as to provide oil with a temperature of around 100° C. to the journal bearings 44.

To supply oil to the gears 28, 32, 38, the remainder of this cooled oil may be mixed with the uncooled oil from the main tank 2002' so as to provide oil with a temperature of around 120° C. to the gears.

It will be appreciated that these temperatures are provided by way of example values at cruise operation only, and may vary between implementations.

In some implementations, the hottest oil (e.g. from the engine components 33 including the AGB) may be sent directly to a fuel-oil heat exchanger 1007 instead of being mixed with cooler oil in the main tank 2002' first so as to increase a temperature rise of the fuel.

The oil system may further comprise one or more valves arranged to control the mixing of oil flows—for example, a Journal Shut-Off Valve (JSOV) and a Variable Oil Recirculation Valve (VORV) may be provided to control oil flow to the journal bearings 44. The JSOV may be a passive valve based on oil pressure—if the oil pressure is low, the valve may automatically create a closed loop circuit feeding oil from the power gearbox (PGB) sump 2008a' back to the PGB journal bearings 44. The VORV may control the proportions of oil from the sump 2008a', auxiliary tank 2008b', and heat exchange system 2020, 1007, in the oil sent to the PGB journal bearings 44, for example based on feedback from one or more temperature sensors.

The inventors appreciated that the use of fuels different from the traditional kerosene-based jet fuels, such as sustainable aviation fuels for example, may allow for more heat to be transferred from the oil to the fuel per unit volume of the fuel through the heat exchange system. Higher fuel temperatures on entry to the combustor may allow for improved fuel burn efficiency, and/or improved oil cooling, as described above.

Figure 18:
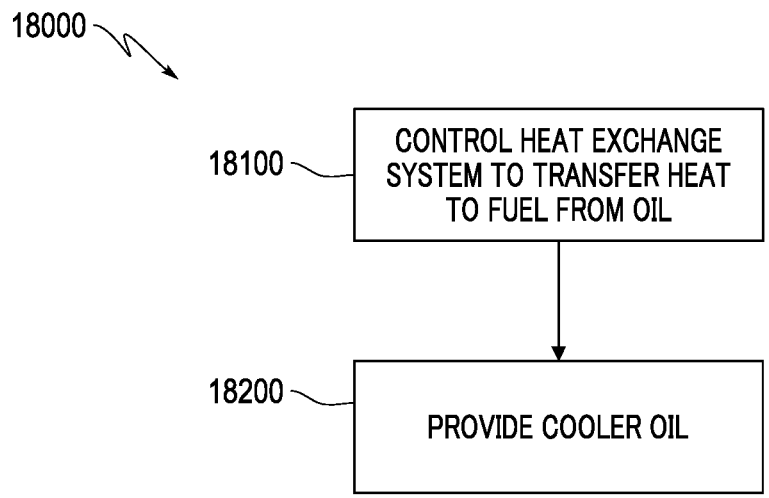
FIG. 18 is an example method of operating a gas turbine engine, which may be a geared gas turbine engine.

FIG. 18 illustrates an example method 18000 of operating a geared gas turbine engine 10 with a gearbox 30 comprising gears 28, 32, 38 and journal bearings 44. The method 18000 comprises the steps of:

Step 18100: Controlling the heat exchange system so as to transfer 200-600 kJ/m$^3$ of heat to the fuel from the oil at cruise conditions.

This transfer of heat from the oil to the fuel may be used to control the oil temperature on entry to the gearbox.

Controlling the heat exchange system may comprise controlling oil flow and/or fuel flow through the main and IDG fuel-oil heat exchangers 1005, 1007, for example using one or more bypass pipes or recirculation loops 6010, 6011 as described above.

In various implementations as discussed above, the controlling 18100 the heat exchange system may comprise controlling fuel flow through the main and IDG fuel-oil heat exchangers 1005, 1007.

Fuel flow may be controlled using a recirculation valve 6010 where present. An actively controlled amount of fuel leaving the main fuel-oil heat exchanger 1007 may be recirculated to the inlet of the main fuel-oil heat exchanger 1007 rather than flowing directly to the combustor 16. This recirculation may also take fuel which has already passed through the engine fuel pump 1003 back to a position upstream of the engine fuel pump 1003, depending on the location of the recirculation loop.

Alternatively or additionally, fuel flow may be controlled by using one or more bypass pipes arranged to allow a proportion of the fuel to avoid passing through either or both fuel-oil heat exchangers.

The speed of the pump 1003 may also be adjusted, either speeding up fuel flow rate (so reducing heat transfer per unit volume passing through the heat exchangers) or reducing fuel flow rate (so increasing heat transfer per unit volume passing through the heat exchangers).

The controlling 18100 the heat exchange system may comprise controlling oil flow through the main and/or IDG fuel-oil heat exchangers 1005, 1007, and/or through one or more other heat exchangers—e.g. an oil-oil heat exchanger 2030 between separate closed loop oil systems, in engine architectures with multiple closed loop oil systems, or an air-oil heat exchanger 2020.

Additionally or alternatively, as for fuel flow, oil flow may be controlled using one or more bypass pipes, where present, allowing oil to bypass one or more heat exchangers 1005, 1007 instead of flowing therethrough. Oil may also be recirculated in some implementations, and/or oil flow rate may be adjusted by controlling one or more oil pumps.

The heat exchange system may comprise a controller arranged to implement this control. The controller may receive inputs from one or more temperature sensors, and may control one or more valves, and/or the pump 1003, based on the received data. The heat exchange system may comprise one or more valves, pumps, and/or recirculation or bypass pipes in addition to those explicitly shown and described herein to facilitate this control.

The active control of fuel and/or oil flow rates may be performed based on one or more parameters such as:
Core shaft speed and engine thrust demand;
Current fuel temperature and/or oil temperature at one or more locations;
Fuel calorific value;
Fuel viscosity;
Fuel flow rate to the combustor (commonly referred to as WFE—Weight of Main Engine Fuel Flow);
Fan rotational speed; and
Main/engine fuel pump speed, or speed options.

In alternative examples, the control of the amount of fuel leaving the main fuel-oil heat exchanger 1007 to be recirculated may not be an active method step—instead, a set, fixed, proportion of the fuel may be recirculated. Alternatively, no fuel may be recirculated, and no recirculation route may be available in some implementations.

Step 18200: Providing cooler oil to the journal bearings 44 of the gearbox 30 than to the gears 28, 32, 38.

The lubrication (and/or cooling) system 2000a' comprises a first oil tank 2002' arranged to supply oil to the gearbox gears and journal bearings, and a second oil tank 2008b' arranged to supply oil to the journal bearings only, so providing differing oil flows to each and allowing for individual oil temperature control. The lubrication system 2000a' may also comprise a bypass pipe 2005 allowing some of the oil from the main tank 2002' to bypass one or more heat exchangers—this uncooled oil may be supplied to the gears 28, 32, 38 of the power gearbox 30, but not to the journal bearings 44 of the power gearbox 30, so again increasing the oil temperature of oil provided to the gears as compared to that provided to the journal bearings.

It will be understood that the invention is not limited to the implementations above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of operating a gas turbine engine, the gas turbine engine comprising:
an engine core comprising a combustor configured to burn a fuel; a turbine, the turbine comprising a plurality of turbine blades; a compressor configured to be used as a source of cooling air for the turbine blades; and an inducer configured to accelerate and direct the cooling air onto the turbine blades, the inducer comprising a plurality of airflow passageways and a modulating valve configured to control cooling air flow into a subset of the passageways; and a fuel management system comprising two fuel-oil heat exchangers through which oil and the fuel flow, the fuel-oil heat exchangers configured to transfer heat between the oil and the fuel and comprising a primary fuel-oil heat exchanger and a secondary fuel-oil heat exchanger;

wherein the method comprises:

using the fuel management system to provide a fuel with a sulphur content of less than 30 ppm to the combustor; and controlling the modulating valve to adjust the cooling air flow based on turbine inlet temperature, wherein for fuel that passes through both fuel-oil heat exchangers, a ratio of heat transfer from the oil to the fuel for the primary and secondary fuel-oil heat exchangers is between 70:30 and 90:10, and the fuel comprises sustainable aviation fuel, and the fuel is up to and including 100% sustainable aviation fuel.

2. The method of claim 1, wherein the fuel has an aromatic content of less than 10% by volume.

3. The method of claim 1, wherein the fuel has an aromatic content of no more than 5% by volume.

4. The method of claim 1, wherein the fuel has an aromatic content of no more than 1% by volume.

5. The method of claim 1, wherein the fuel has a sulphur content of less than 15 ppm.

6. The method of claim 1, wherein the fuel has a density in the range from 760-800 kg/m$^3$ at 15° C.

7. The method of claim 1, wherein between 10% and 30% of the fuel is delivered to the secondary fuel-oil heat exchanger.

8. The method of claim 1, wherein between 10% and 20% of the fuel is delivered to the secondary fuel-oil heat exchanger.

9. The method of claim 1, wherein the fuel flows through the primary fuel-oil heat exchanger prior to flowing through the secondary fuel-oil heat exchanger whereas the oil flows through the secondary fuel-oil heat exchanger prior to flowing through the primary fuel-oil heat exchanger.

10. A gas turbine engine for an aircraft, the gas turbine engine comprising:

an engine core comprising a combustor configured to burn a sustainable aviation fuel with a sulphur content of less than 30 ppm;

a turbine, the turbine comprising a plurality of turbine blades; a compressor configured to be used as a source of cooling air for the turbine blades; and an inducer configured to accelerate and direct the cooling air onto the turbine blades and comprising a plurality of airflow passageways and a modulating valve configured to control cooling air flow into a subset of the passageways, wherein the modulating valve is configured to adjust the cooling air flow based on turbine inlet temperature; and a fuel management system configured to provide the fuel to the combustor, wherein the fuel management system comprises: two fuel-oil heat exchangers through which oil and the fuel flow, the fuel-oil heat exchangers being configured to transfer heat between the oil and the fuel and comprising a primary fuel-oil heat exchanger and a secondary fuel-oil heat exchanger;

wherein the fuel management system is configured so that a ratio of heat transfer from the oil to the fuel for the primary and secondary fuel-oil heat exchangers is between 70:30 and 90:10.

11. The gas turbine engine of claim 10, wherein the fuel has a density in the range from 760-840 kg/m$^3$ at 15° C.

12. The gas turbine engine of claim 10, wherein the fuel has an aromatic content of no more than 10% by volume.

13. The gas turbine engine of claim 10, wherein the fuel has an aromatic content of no more than 5% by volume.

14. The gas turbine engine of claim 10, wherein the secondary fuel-oil heat exchanger is a servo fuel-oil heat exchanger.

15. The gas turbine engine of claim 10, wherein between 10% and 30% of the fuel is delivered to the secondary fuel-oil heat exchanger.

16. The gas turbine engine of claim 10, wherein between 10% and 20% of the fuel is delivered to the secondary fuel-oil heat exchanger.

17. The gas turbine engine of claim 10, wherein a ratio of heat transfer from the oil to the fuel for the primary and secondary fuel-oil heat exchangers is approximately 80:20.

18. The gas turbine engine of claim 10, wherein the fuel flows through the primary fuel-oil heat exchanger prior to flowing through the secondary fuel-oil heat exchanger whereas the oil flows through the secondary fuel-oil heat exchanger prior to flowing through the primary fuel-oil heat exchanger.

* * * * *